(12) United States Patent
Simonov et al.

(10) Patent No.: US 8,941,818 B2
(45) Date of Patent: Jan. 27, 2015

(54) OPTICAL RANGEFINDER AND IMAGING APPARATUS WITH CHIRAL OPTICAL ARRANGEMENT

(75) Inventors: Aleksey Nikolaevich Simonov, Delft (NL); Michiel Christiaan Rombach, Breda (NL)

(73) Assignee: ASMR Holding B.V., Breda (NL)

( * ) Notice: Subject to any disclaimer, the term of this patent is extended or adjusted under 35 U.S.C. 154(b) by 389 days.

(21) Appl. No.: 13/143,655

(22) PCT Filed: Jan. 8, 2010

(86) PCT No.: PCT/NL2010/050007
§ 371 (c)(1),
(2), (4) Date: Dec. 1, 2011

(87) PCT Pub. No.: WO2010/080030
PCT Pub. Date: Jul. 15, 2010

(65) Prior Publication Data
US 2012/0069320 A1 Mar. 22, 2012

(30) Foreign Application Priority Data

Jan. 9, 2009 (NL) .................................. 2002406
May 26, 2009 (NL) .................................. 2002926
Nov. 27, 2009 (NL) .................................. 2003876

(51) Int. Cl.
*G01C 3/08* (2006.01)
*G01C 3/32* (2006.01)

(52) U.S. Cl.
CPC ... *G01C 3/08* (2013.01); *G01C 3/32* (2013.01)
USPC ....... 356/4.04; 356/3.14; 356/4.03; 356/4.05; 356/22

(58) Field of Classification Search
CPC ............ G01C 3/08; G01C 3/32; G01S 17/08; G01B 11/026; G01B 2210/50
USPC .......................... 356/4.04, 3.14, 4.03, 4.05, 22
See application file for complete search history.

(56) References Cited

U.S. PATENT DOCUMENTS 4,556,950 A 12/1985 Tai et al.
4,856,884 A 8/1989 Fender et al.
(Continued)

FOREIGN PATENT DOCUMENTS

WO WO 2010/080030 A2 7/2010

OTHER PUBLICATIONS

PCT/NL2010/050007, International Search Report and Written Opinion, Jun. 16, 2011.

*Primary Examiner* — Isam Alsomiri
*Assistant Examiner* — Samantha K Abraham
(74) *Attorney, Agent, or Firm* — Jason A. Bernstein; Barnes & Thornburg LLP

(57) ABSTRACT

An optical rangefinder having a photosensor adapted to transform the image projected thereon into an electronic image, an imaging system for projecting an image of an object on the photosensor, an optical arrangement to modulate the incoming light forming the image on the photosensor, means for providing the spatial spectrum of the image and means for deriving the distance from the object to the rangefinder on the degree of defocus of the image, wherein the optical arrangement is adapted to modulate the incoming light such that the degree of defocus of the image on the photosensor relative to the in-focus image plane results in displacement of the spatial spectrum of the image relative to a reference pattern and wherein the rangefinder has means for deriving the degree of defocus from the degree of displacement.

10 Claims, 12 Drawing Sheets

(56) References Cited

U.S. PATENT DOCUMENTS

| | | | |
|---|---|---|---|
| 4,903,204 A * | 2/1990 | Dobbins, III | 382/255 |
| 5,337,181 A | 8/1994 | Kelly | |
| 5,521,695 A | 5/1996 | Cathey, Jr. et al. | |
| 5,870,179 A | 2/1999 | Cathey, Jr. et al. | |
| 5,878,152 A * | 3/1999 | Sussman | 382/106 |
| 7,218,448 B1 | 5/2007 | Cathey, Jr. et al. | |
| 7,495,200 B1 * | 2/2009 | Andersen | 250/201.9 |
| 7,635,832 B2 * | 12/2009 | Dean | 250/208.1 |
| 7,636,168 B2 * | 12/2009 | De Lega et al. | 356/512 |
| 7,639,877 B2 * | 12/2009 | Shiota et al. | 382/190 |
| 7,663,502 B2 * | 2/2010 | Breed | 340/12.25 |
| 7,869,854 B2 * | 1/2011 | Shachar et al. | 600/374 |
| 8,085,388 B2 * | 12/2011 | Kaufman et al. | 356/5.01 |
| 8,285,010 B2 * | 10/2012 | Rowe | 382/124 |
| 2004/0017502 A1 | 1/2004 | Alderson | |
| 2004/0070565 A1 * | 4/2004 | Nayar et al. | 345/156 |
| 2005/0271300 A1 * | 12/2005 | Pina | 382/294 |
| 2006/0109369 A1 | 5/2006 | Yamazaki | |
| 2008/0137059 A1 | 6/2008 | Piestun et al. | |
| 2008/0204686 A1 * | 8/2008 | Henke et al. | 355/53 |
| 2008/0205872 A1 | 8/2008 | Kinugasa | |

* cited by examiner

OPTICAL RANGEFINDER AND IMAGING APPARATUS WITH CHIRAL OPTICAL ARRANGEMENT

PRIORITY CLAIM

This patent application is a U.S. National Phase of International Patent Application No. PCT/NL2010/050007, filed Jan. 8, 2010, which claims priority to Netherlands Patent Application No. 2003876, filed Nov. 27, 2009; Netherlands Patent Application No. 2002926, filed May 26, 2009; and Netherlands Patent Application No. 2002406, filed Jan. 9, 2009, the disclosures of which are incorporated herein by reference in their entirety.

BACKGROUND

Rangefinding, including passive rangefinding, being the estimation of the distance from an observer or observing apparatus to an object or multiple objects of interest or an extended scene is of importance for consumer, military, technical and scientific applications.

Optical rangefinders based on geometrical methods, i.e., operating as angle-measuring devices, are in use since the nineteenth century. In stadimetric systems the distance is calculated, or, alternatively, derived, from the angular size of an object once the dimensions of the object are known a priori (for example, as disclosed in an early prior art document 2,289 from the year 1799), and in parallax/coincidence rangefinders the distance is evaluated from the parallax error of several images of the same object. These devices are passive by nature and their precision is limited by the precision of angular measurements. Passive triangulation methods are also employed in modern photographic cameras (for example, K. Engelhardt and R. Knop, Appl. Opt. 34, 2339-2344, 1995) to estimate the degree of defocus at several locations in the image field.

In modern imaging devices passive rangefinding can be accomplished with phase detection or contrast measurement methods. Phase detection methods (for example, WO2005/098501 and US2008/205872) split the light after the primary objective into several channels with known light-path lengths and analyze the sub-images for differences in light intensity. Contrast measurement methods (for example, US2006109369 and US2004017502) optimize the contrast of the image, or part of the image, on the photosensor by changing the focusing condition.

The above methods differ, in all their aspects, from the rangefinder apparatus and corresponding methods described in the present document which do neither require triangulation or angular measurement of the object nor contrast evaluation or comparison of phase delayed sub-images.

SUMMARY

One aspect of the present disclosure relates to an optical rangefinder having a photosensor adapted to transform the image projected thereon into an electronic image, an imaging system for projecting an image of an object on the photosensor, an optical arrangement to modulate the incoming light forming the image on the photosensor, means for providing the spatial spectrum of the image and means for deriving the distance from the object to the rangefinder on the degree of defocus of the image, wherein the optical arrangement is adapted to modulate the incoming light such that the degree of defocus of the image on the photosensor relative to the in-focus image plane results in displacement of the spatial spectrum of the image relative to a reference pattern and wherein the rangefinder has means for deriving the degree of defocus from the degree of displacement.

BRIEF DESCRIPTION OF THE DRAWINGS

The drawings disclose exemplary embodiments in which like reference characters designate the same or similar parts throughout the figures of which.

and the phase function is given by $$\vartheta(x, y) = \begin{cases} 50y, & x \ge 0 \\ 0, & x < 0. \end{cases}$$

Pictures 13, 15 and 17 represent the modulus of the OTF i.e. the MTF, calculated at defocus values $\phi=0$, $\phi=5$ and $\phi=10$, respectively. Pictures 14, 16 and 18 show the corresponding PSFs. These pictures cover the spatial frequency region $-2\le\omega_x\le2$, $-2\le\omega_y\le2$ and the spatial region $-7.6\le x\le7.6$, $-7.6\le y\le7.6$, respectively, all variables are dimensionless. Dashed lines, 19, are the horizontal lines along the shift directions of the PSF lobes. As seen from the MTF pictures, increasing defocus yields distinct rotation of the line pattern in the spatial spectrum. Central lines remain almost undistorted and easily detectable. On the contrary, the PSF is propagation-variant—its lobes move horizontally along the lines, 19, in opposite directions, and experience diffraction and scaling.

Figure 6:
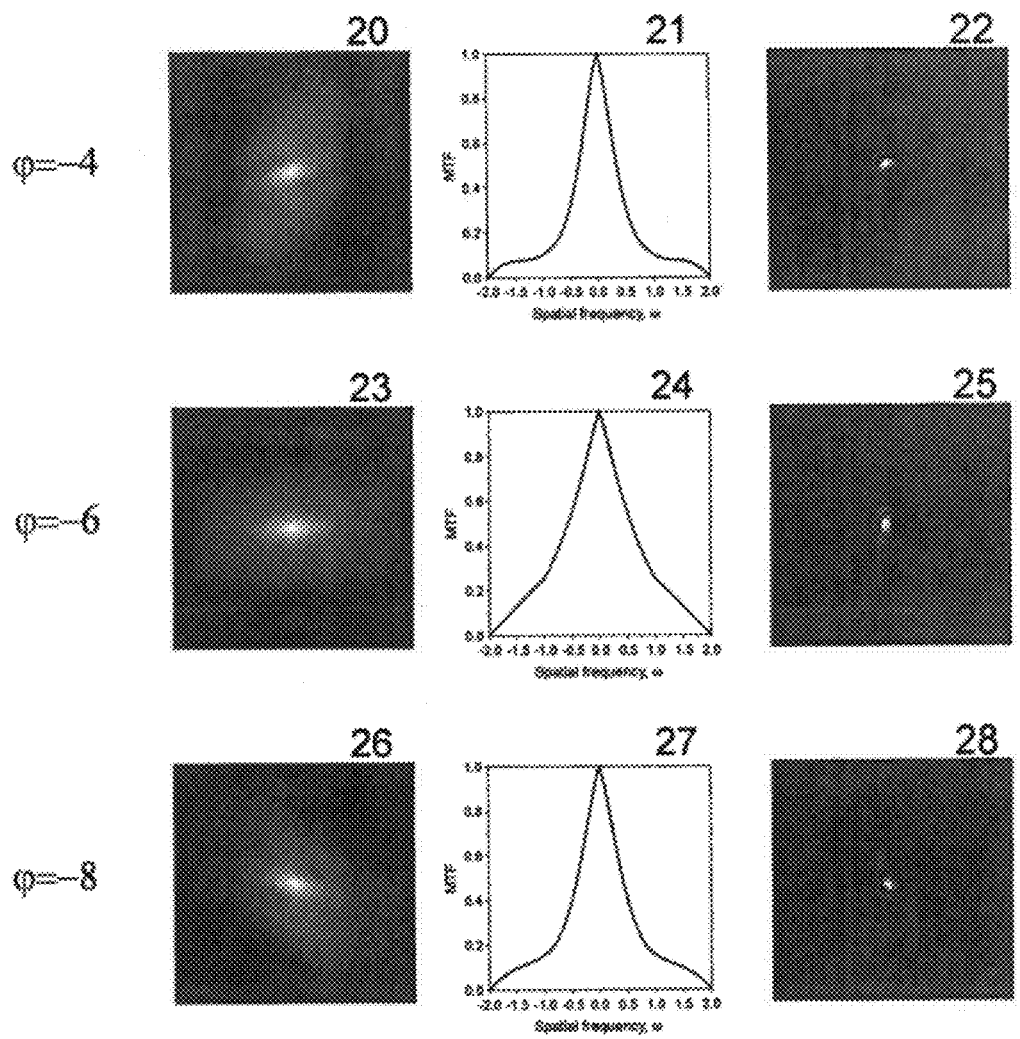

FIG. 6 illustrates the optical response of a chiral optical arrangement for imaging, in this example, a parabolic screw optical mask with the phase function $\theta(r,\alpha)=2r^2\alpha$ defined in a circular aperture of a unit radius. Pictures 20, 23 and 26 represent the modulus of the OTF, i.e. the MTF, calculated at defocus values $\phi=-4$, $\phi=-6$ and $\phi=-8$, respectively. Plots 21, 24 and 27 depict the central horizontal cross sections of the MTFs. Pictures 22, 25 and 28 show the corresponding PSFs.

The MTF and PSF pictures cover the spatial frequency region $-2 \leq \omega_x \leq 2$, $-\leq \omega_y \leq 2$ and the spatial region $-7.6 \leq x \leq 7.6$, $-7.6 \leq y \leq 7.6$, respectively, all variables are dimensionless. As seen from the MTF pictures and cross sections, changes in defocus result in distinct rotation of the central structure of the spatial spectrum while the modulus of the OTF remains positive, i.e. has no zeros. Note that the PSF has only one well-centered lobe whose intensity distribution weakly dependents on defocus—the lobe elongates directionally.

Figure 7:
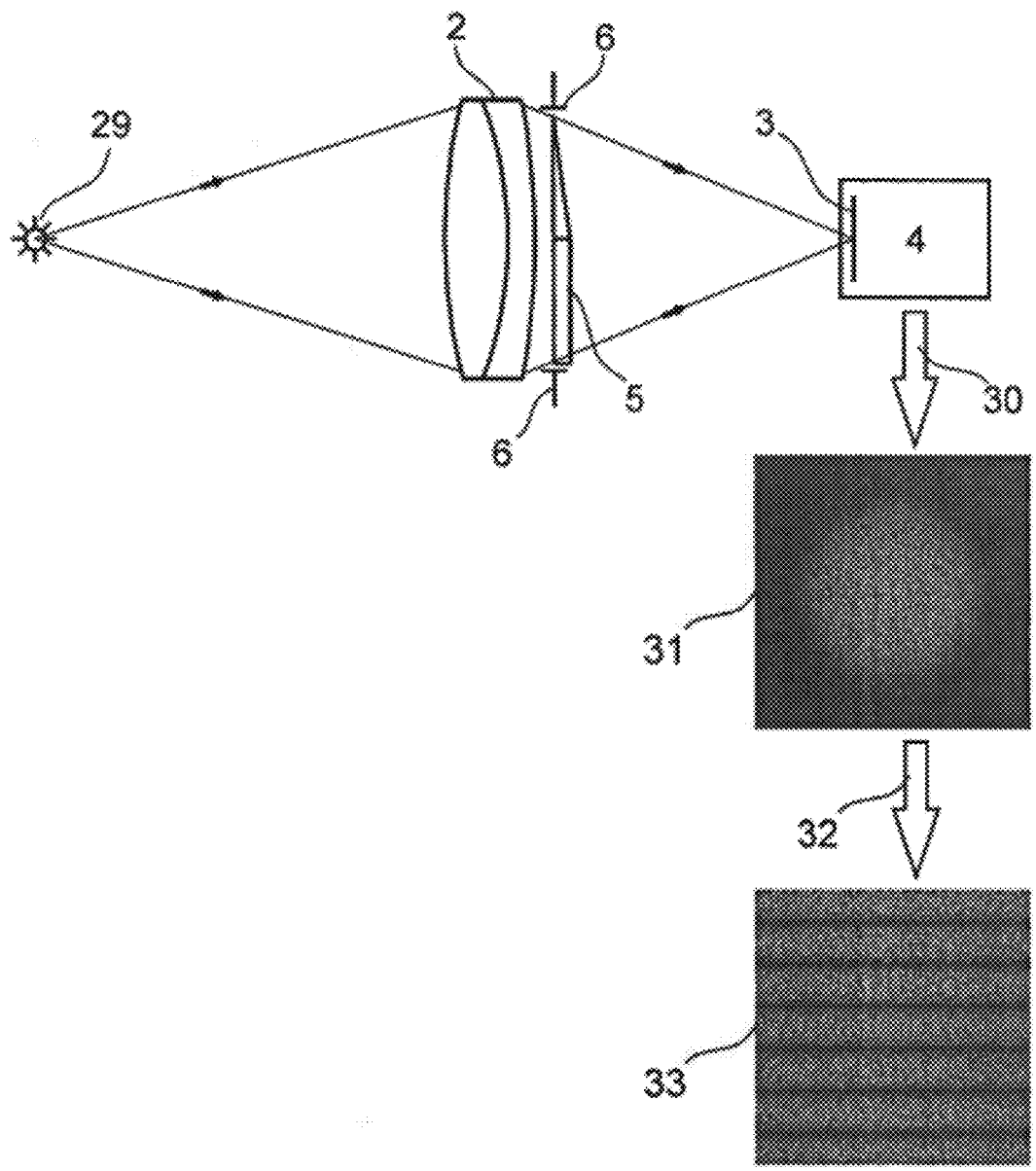

FIG. 7 shows the generation of a reference pattern, in this example, the characteristic pattern corresponding to the inherent spectral response of the optical mask. Light emerging from an object, 29, (which can be any standard object or scene during, for example, factory calibration of the apparatus) is projected by imaging optics, 2, through an optical mask, 5, onto the image plane, 3, of a photosensor, 4. The photosensor, 4, converts, 30, the projected light into a corresponding electronic image, 31, which is transformed, by a processing means, 32, into a spatial spectrum, 33. The spatial spectrum 33 is the resulting reference pattern. In this example, the object, 29, is a plane illuminated by a random pattern.

Figure 8:
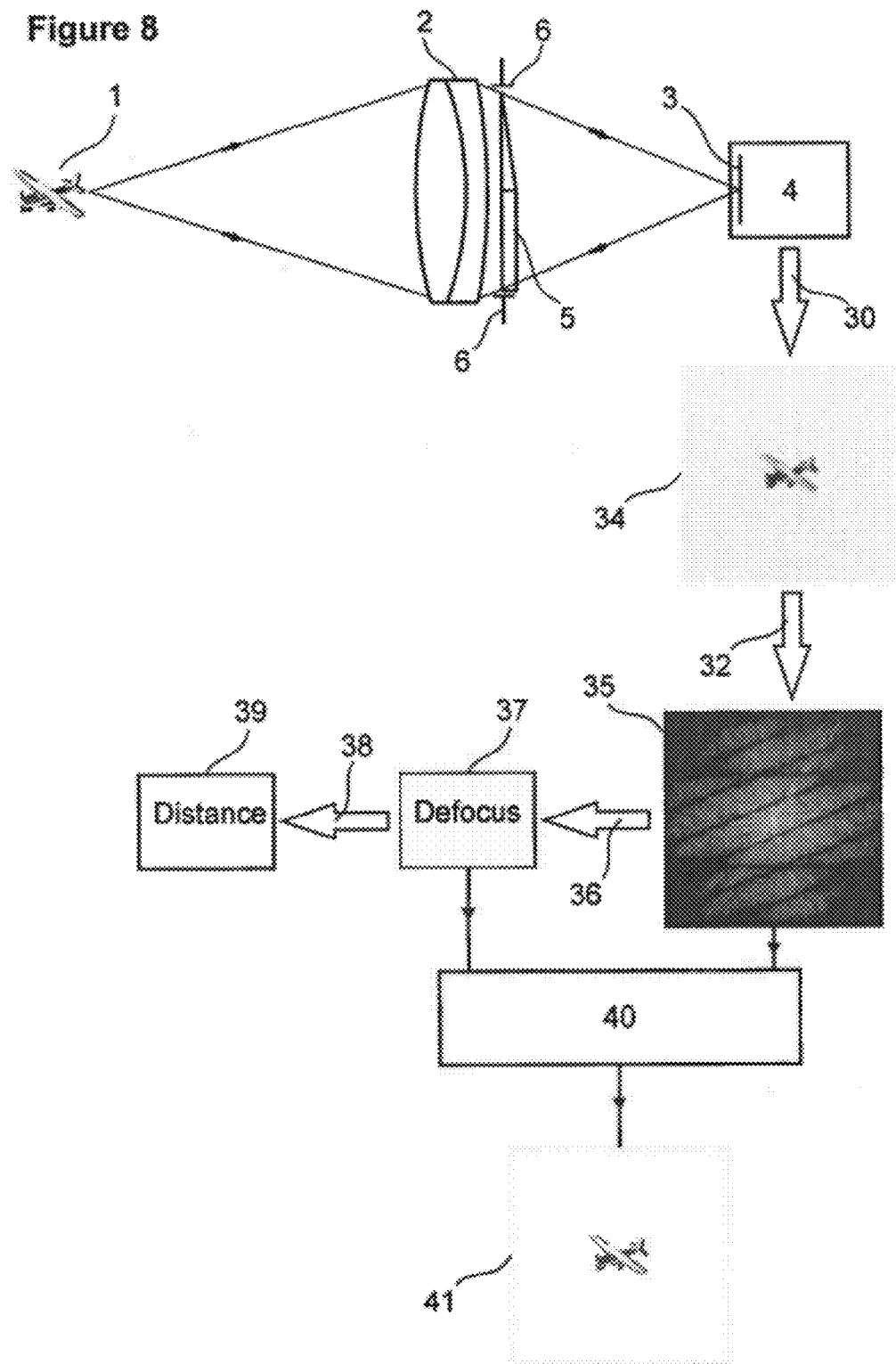

FIG. 8 shows the method for rangefinding and imaging. Light emerging from an object, 1, is projected by imaging optics, 2, through an optical mask, 5, onto the image plane, 3, of a photosensor, 4. The photosensor, 4, provides, 30, the electronic image, 34, which is transformed, by the processing means, 32, into a spatial spectrum, 35. An additional processing means, 36, evaluates the degree of defocus, 37, of the image and then by processing, 38, the distance, 39, to the object is calculated. By processing the spatial spectrum, 35, and the evaluated defocus, 37, with additional processing means, 40, a reconstructed image, 41, of the object can be obtained.

Figure 1:
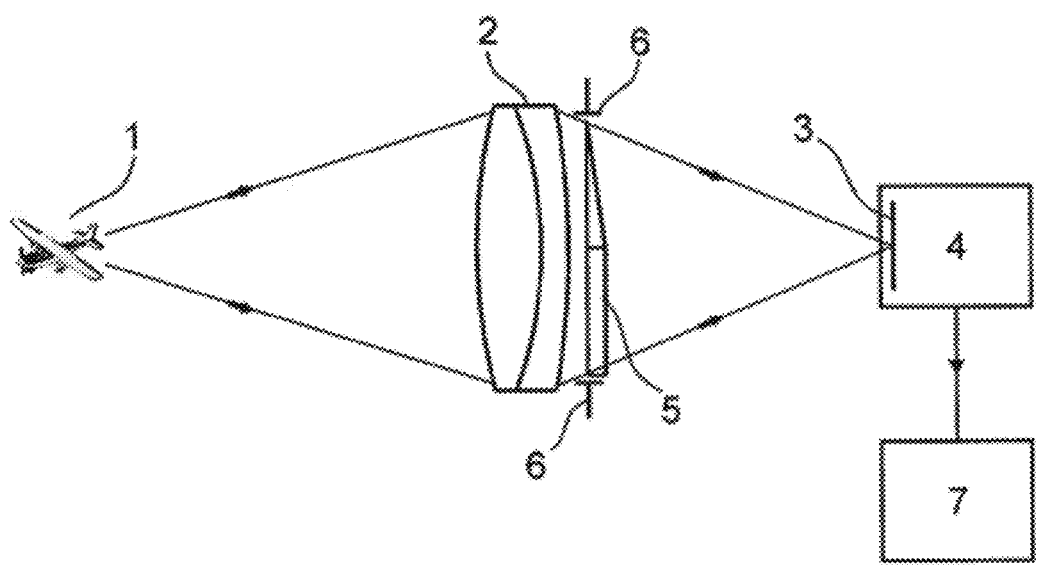
FIG. 1 shows one exemplary basic embodiment of an optical rangefinder and imaging apparatus. Light emerging from an object, 1, is projected by imaging optics, 2, onto the image plane, 3, of a photosensor, 4. An optical mask, 5, positioned in the plane of the exit pupil, 6, modulates the intensity and phase of the transmitted light. Electronic signal produced by the photosensor, 4, is further processed by an electronic processor, 7.
Figure 2:
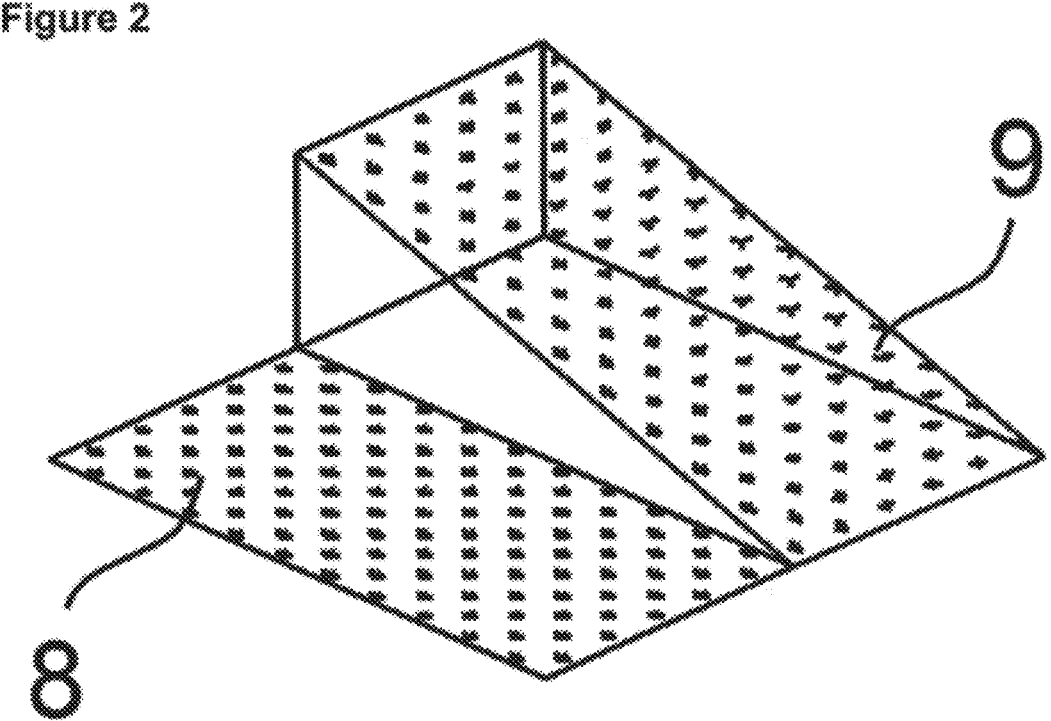
FIG. 2 shows a half-aperture chiral prismatic optical mask, in this example, with a square aperture. The mask comprises one planar element, 8, and one prismatic element, 9.
Figure 9:
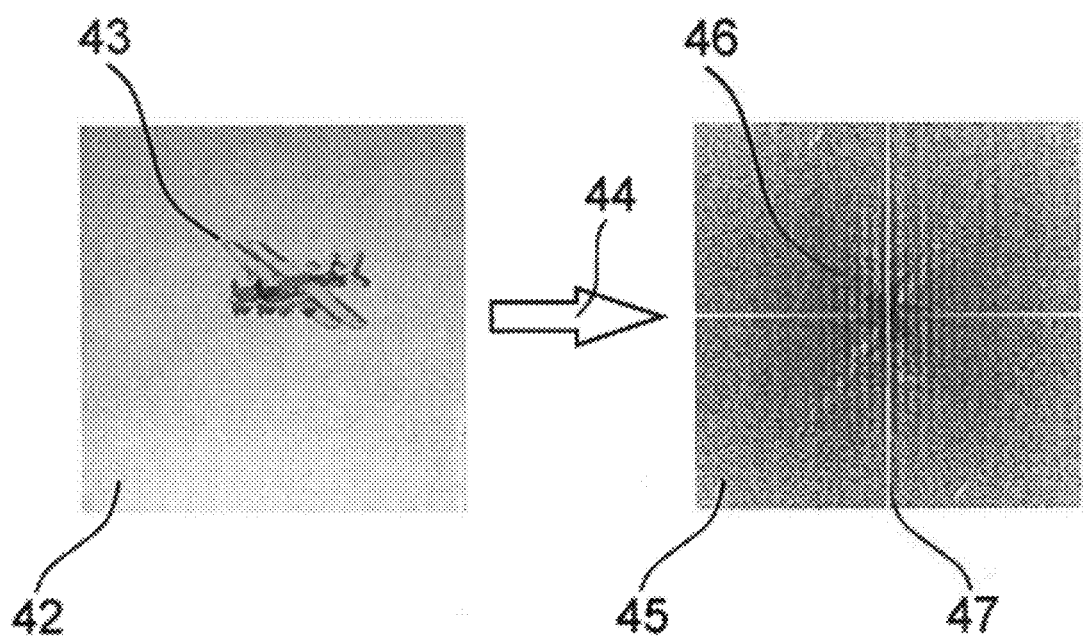

FIG. 9 shows the results from a prototype optical rangefinder with the optical mask designed according to FIG. 2. In this example, the image, 42, on the photosensor depicts the focused image of the object of interest, 43. Spectral decomposition, 44, of the image provides the spatial spectrum, 45, which contains the characteristic pattern of lines, 46, aligned, in this example, with the vertical axis, 47, which can be considered as a reference pattern.

Figure 10:
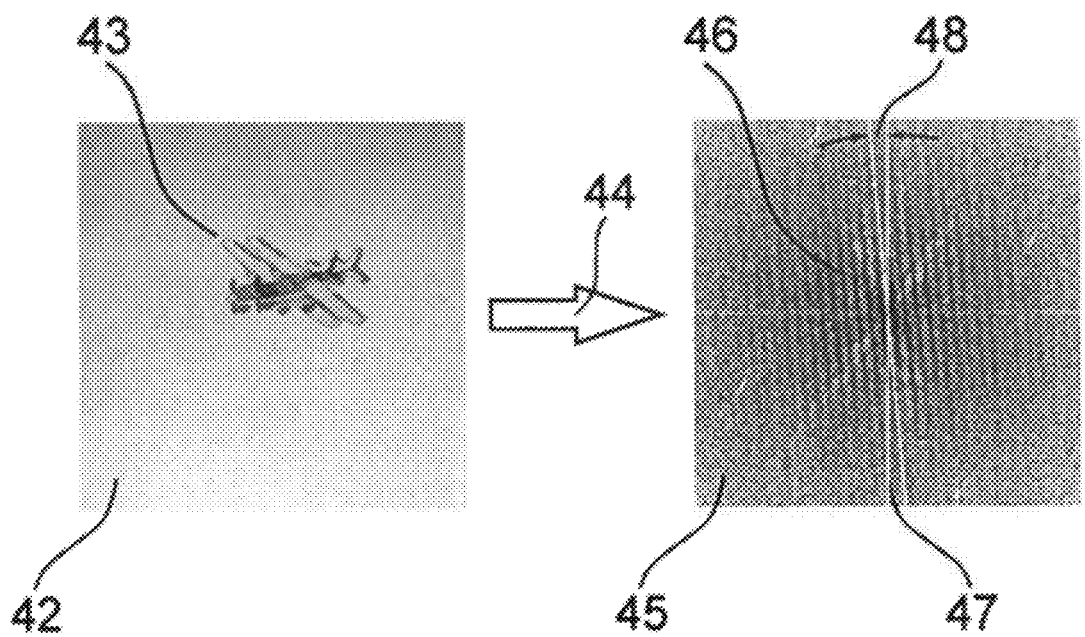

FIG. 10 shows the results from a prototype optical rangefinder with the optical mask designed according to FIG. 2. In this example, the image, 42, on the photosensor depicts the defocused image of the object of interest, 43. Spectral decomposition, 44, of the image provides the spatial spectrum, 45, which contains the characteristic pattern of lines, 46, scaled and angularly rotated (due to defocus), in this example, relative to the vertical axis, 47, by the degree of rotation, 48. The distance to the object can be calculated from the degree of rotation using, for example, formulas given in the present document. Note that the line 47, in this example, can be considered as a reference pattern.

Figure 11:
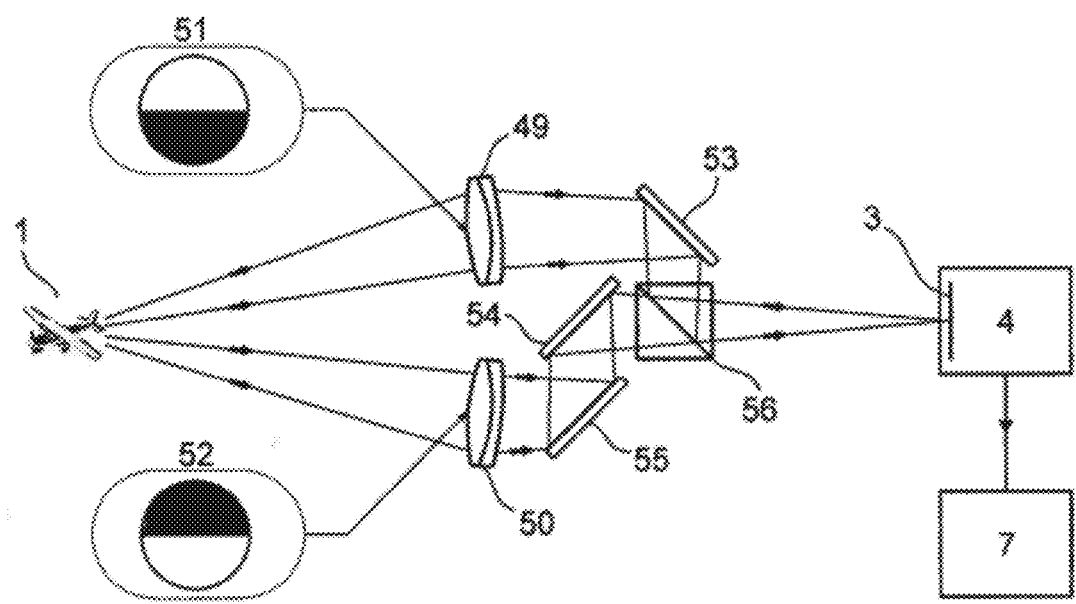

FIG. 11 shows an alternative exemplary embodiment of the optical rangefinder and imaging apparatus with chiral optical arrangement. Light emerging from an object, 1, is collected by two spaced apart lenses, 49 and 50, with half-blocked apertures, 51 and 52, in the plane of the layout and relayed by mirrors, 53, 54, 55, and a beam splitter, 56, onto the image plane, 3, of a photosensor, 4. Electronic signals produced by the photosensor, 4, are further processed by an electronic processor, 7. The relative tilting of the optical channels results in non-zero effective prismatic constant A which in combination with half-blocked apertures, 51 and 52, makes the system arrangement chiral.

Figure 12:
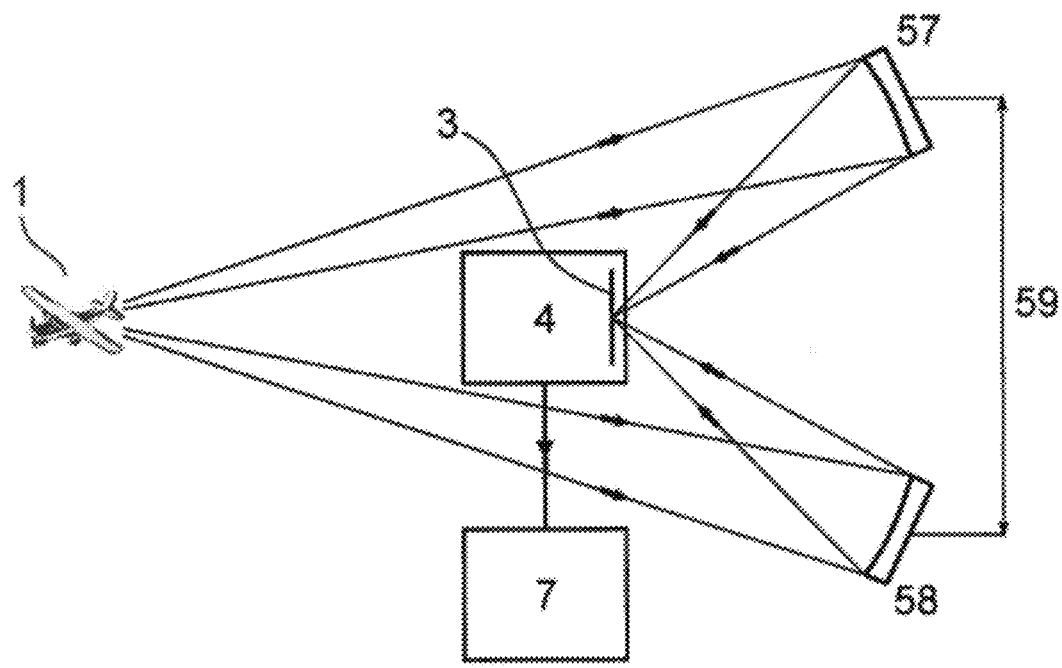

FIG. 12 shows an alternative exemplary embodiment of the optical rangefinder and imaging apparatus with chiral optical arrangement. Light emerging from an object, 1, is reflected by two concave mirrors, 57 and 58, onto the image plane, 3, of a photosensor, 4. The mirrors are widely spaced apart by a distance, 59. Electronic signals produced by the photosensor, 4, are further processed by an electronic processor, 7. The relative tilting of the mirrors, 57 and 58, (preferably in the plane perpendicular to the plane of the optical layout) makes the system chiral. This chiral optical arrangement is one of simplest embodiments providing a high sensitivity when the spacing, 59, is large compared to the diameter of the concave mirrors, 57 and 58.

DETAILED DESCRIPTION

Terms and Definitions

General Terms:

An in focus image plane is the plane optically conjugate to the object plane, and thus, having no focusing error. An image is in focus or sharp when the image plane coincides with the in-focus image plane, and, if not, the image is defocused or blurred, or, alternatively, the image has a certain degree of defocus.

The terms object and image conform to Goodman's definitions for a generalized imaging system (J. W. Goodman, *Introduction to Fourier Optics*, McGraw-Hill Co., Inc., New York, 1996, Chap. 6). The object is positioned in the object plane and the corresponding image is located in the image plane. In mathematical description, object and image refer to data arrays or functions representing distribution of light in the object and image planes, respectively.

Spectral response is generally obtained by Fourier transformation of the intensity impulse response, or other transformations including, but not restricted to, wavelet decomposition and other spectral decompositions, where spectral decomposition is the decomposition of the image into a basis of eigenfunctions of an appropriate operator in the Hilbert space. Spatial spectrum of an image/object is obtained by the spectral decomposition of the image/object data.

A reference pattern, in the context of the present document, denotes any pattern in the spatial spectrum domain that can be used as a reference scale to measure the degree of displacement of the image spectrum caused by defocus. The reference pattern can be any synthetic structure in the spatial spectrum domain, for example, a single line, or a grid of lines. Alternatively, the reference pattern can be a characteristic pattern obtained from the inherent spectral response of the optical arrangement, or optical mask. The characteristic pattern can be conveniently represented by the modulus of the incoherent optical transfer function (OTF), i.e., the modulation transfer function (MTF), calculated with the mask amplitude and phase functions. In practice, the characteristic pattern is useful for measuring and evaluating the displacement of the spatial spectra. A periodic pattern of lines is an example of the characteristic pattern resulting from the optical mask with a chiral prismatic element, for example, a half-aperture prismatic optical mask.

The term defocus map denotes the distribution, generally two-dimensional, of degrees of defocus obtained for a spatially extended object/scene, a depth map provides distances of multiple objects or multiple sub-images and a wavefront map describes the distortion of the wavefront, for example, in the plane of the exit pupil and measured relative to the Gaussian reference sphere. Said maps can be static maps, providing information for a single point in time, or, alternatively, active maps, providing updated information at, for example, real-time speed. The abbreviation EDF is for Extended Depth of Field.

Apparatus and Embodiments

An optical rangefinder measures the distance from at least one object to a predefined location related to the optical rangefinder. An image reconstructor, or in the context of the present document an imaging apparatus, is an optical rangefinder adapted to provide at least one in-focus image of the object which image is reconstructed from, for example, the spatial spectrum of the image. An optical pathfinder is an apparatus to measure the length of the optical path once the distance between the object and the rangefinder is known a priori.

Optical Chirality and Arrangements—

Optical chirality in combination with rangefinding is a main concept of the present document.

A chiral optical element has, at least one, optical surface resulting in chiral phase modulation of the light beam, or, alternatively light signal. The chiral phase modulation, in turn, is associated with the chiral phase function which can be represented by a three-dimensional chiral surface. By definition, the mirror image of the chiral surface cannot be mapped to the original surface by rotations and translations, for example, M. Petitjean, J. Math. Phys. 43, 4147-4157, 2002, which document is included in the present document by reference. In mathematical terms, an object is defined to be chiral if it is not invariant under parity transformation.

A chiral optical arrangement is an arrangement of an optical system characterized in that the arrangement modulates the light such that light approaching the image plane contains chiral phase modulation, or, alternatively, the generalized pupil function of the optical system has a chiral phase.

Chiral modulation is the amplitude and phase modulation of light resulting from the chiral optical arrangement. Chirality signs, or, alternatively, directions; clockwise or counterclockwise, or, right-handed or left-handed, should be preferably the same for each particular optical mask, i.e. one mask should only be comprised of a chirality function, or a combination of chirality functions, of the same sign, but combinations of chirality functions of opposite signs are not excluded. The degree of chirality, in simple cases, e.g. a vortex, can be quantitatively measured in terms of topological charge, in other cases (e.g. a complex three-dimensional surface), the degree of chirality can be calculated in terms of the continuous chirality measure, for example, Salomon et al., J. Mater. Chem. 25, 295-308, 1999.

The present disclosure relates to an apparatus and a method for, basically passive (with no active illumination of the object), solid (with no moving parts) optical rangefinding, which can be adapted to form an imaging apparatus or a combination of a rangefinder and an imaging apparatus to carry out distance measurements and provide in-focus imaging of an object by optical/digital processing. The rangefinding apparatus is, in essence, a passive optical rangefinder, but it can be adapted to become an active optical rangefinder by adding illumination/light-projection units, for example, visible search lights, IR-lights, various types of laser-lights, projectors of specific light patterns such as grids illuminating the object, and so forth. The rangefinder has no moving parts, which is advantageous for fabrication, applications and manufacturing costs of the apparatus. In combination with the additional imaging apparatus described in the present document it can provide targeting of objects in both passive and active modes.

From the description herein of exemplary embodiments and aspects of the apparatus and methods a number of applications can be derived. Several examples are listed below, but possible applications are not restricted to the listed examples. The apparatus and methods described in the present document allow: First, estimating the degree of defocus in the image plane relative to the in-focus image plane without prior knowledge of the distance to the object; second, evaluating the distance from an object to the rangefinder. The described apparatus can be adapted to, third, reconstruct in-focus images from defocused images; fourth, calculate the degrees of defocus of multiple sub-images from the corresponding sub-areas of the image; fifth, reconstruct multiple in-focus sub-images from the corresponding sub-areas of the image; sixth, combine multiple in-focus sub-images from the corresponding multiple sub-areas of the image into a "synthetic" in-focus/EDF image; seventh, to construct defocus maps and, subsequently, depth maps; eighth, to calculate speed and distance of an object by analyzing images or sub-images in consecutive time periods; ninth, to characterize the wavefront of the incoming light by analyzing local degrees of defocus and construct wavefront maps. Those skilled in the arts may conclude that the inherent optical response of the optical mask can be dependent on the wavelength of light, and thus, tenth, the described apparatus can be modified to determine the spectrum of light. In various technical applications, a rangefinder combined with a spectrometer can be advantageous. Eleventh, the optical rangefinder described in the present document can, in principle, be a rangefinder or imaging apparatus or combination thereof adapted for application to all processes involving waves, but is most directly applicable to incoherent monochromatic wave processes in optics. The invention can be directly applied to infrared and ultraviolet spectra. X-rays produced by an incandescent cathode tube are, by definition, not coherent and not monochromatic, but the methods can be used for X-rays by application of, for example, a crystalline monochromator to produce monochromacity. For ultrasound and coherent radio frequency signals the formulas can be adapted for the coherent amplitude transfer function of the corresponding system. Using polychromatic light, but separated in quasi-monochromatic spectral components. A rangefinder can also be adapted to analyze multiple color channels by dividing, for example, the surface of the optical mask in three sections, with one section equipped with a red (R) filter, one section with a blue (B) filter and one section with a green (G) filter in combination with, at least one, photosensor with a corresponding, for example, Bayer color filter pattern. Images corresponding to R, B and G bands can be independently analyzed and rangefinding can be accomplished separately for each spectral band. Alternatively, a tunable spectral selection device, for example, an adjustable color filter, or a diffraction grating can be applied to choose the operating spectrum of the rangefinder.

U.S. Publication No. US2008/0137059 and corresponding documents (A. Greengard et al., Opt. Lett. 21, 181-183, 2006, and S. R. P. Pavani and R. Piestun, Opt. Expr. 16, 3484-3489, 2008), which prior invention included in combination of said documents, will henceforth be referred to as rangefinder according to US2008/0137059.

The concept of passive optical rangefinding according to US2008/0137059 is based on earlier studies of Schechner (Y. Y. Schechner et al., Phys. Rev. E 54, R54-R53, 1996) and Piestun (R. Piestun et al., J. Opt. Soc. Am. A 17, 294-303, 2000) addressing the propagation effects of the light beam consisting of a superposition of Gauss-Laguerre (GL) modes. A generalized self-imaging condition has been found and the relation for the rotation rate of the transverse intensity distribution (which is invariant upon propagation) as a function of the longitudinal coordinate, z, has been derived for a superposition of GL modes. It should be noted that the theoretical analysis in US2008/0137059 relates to coherent illumination. The optical rangefinder according to US2008/0137059 is designed in a such way that its amplitude (coherent) point spread function, h, can be expressed as a combination of GL modes satisfying the rotational self-imaging condition, i.e. the corresponding transverse intensity distribution, $\sim|h|^2$, rotates and remains invariant upon propagation. In incoherent light, the intensity PSF, given by $|h|^2$, remains rotating upon propagation in a way similar to those of h. When the optical system with the rotating PSF images an extended object or scene, the resulting "rotated image", I, is a convolution of the rotating PSF, $|h|^2$, and the image of the object, $I_0$, i.e. $I=|h|^2 \otimes I_0$. It should be noted that $I_0$ is not known in advance, so to evaluate the unknown distance, at first, the rotating PSF has to be found and only then the distance can be calculated from the dependency of $|h|^2$ on defocus. This requires deconvolution of the rotating PSF which means that additional information on $I_0$ has to be provided. In US2008/0137059 this step is referred as to "receiving a reference image" followed by "deconvolution of the rotating PSF". Thus, rangefinding according to US2008/0137059 requires at least two images, or a priory knowledge of the object structure.

The invention described in the present document differs in design, embodiments and methods from the rangefinder according to US2008/0137059 and several, but not necessarily all, differences are:

First, as explained above, rangefinding according to US2008/0137059 requires calculation, or deconvolution of the PSF and, thus, in addition to the detected image, I, a "reference image,", "calibration image," or "theoretical image", i.e. $I_0$, has to be provided for evaluating the rotating PSF. Those skilled in the art may conclude that for such images to be constructed the precise structure, e.g. intensity distribution, $I_0$, in the object plane, must be known. So, in practice, the reference image must be an image of the object or be derived from an image of the object, unless the object is a point source when, for example, $I_0 \sim \delta(r)$ and, thus, $I \sim |h|^2$. US2008/0137059 describes a method to get an additional reference frame by stopping down the aperture of the imaging system. The present invention determines the distance from one image of the object without any assumptions about the object structure. The degree of defocus is directly derived from the degree of displacement of the image spectrum relative to, for example, a reference axis, or a reference pattern known in advance from the optical arrangement of the rangefinder.

Second, those skilled in the art may conclude that imaging by an optical system can be equivalently described in physical domain (in terms of the PSF, $|h|^2$, and intensity distributions, I and $I_0$) and in the spatial frequency domain (in terms of the OTF, H, and corresponding spatial spectra, $\tilde{I}$ and $\tilde{I}_0$). However, using the OTF for passive ranging presents a crucial advantage—namely, unknown defocus can be directly derived from the image spectrum. Denoting $\tilde{I}=F[I]$, $\tilde{I}_0=F[I_0]$ and $H=F[|h|^2]$, where F is the Fourier transform, assuming for simplicity that the optical system is isoplanatic, the imaging equation becomes $\tilde{I}=H\tilde{I}_0$. Thus, H modulates the spatial spectrum, $\tilde{I}$, of the image in a predetermined manner. The present invention specifies the OTF, H, as introducing displacements (depending on defocus) in the image spectrum and, optionally, creating a characteristic pattern to make these displacements detectable. The displacements in the image spectrum can be measured, for example, by evaluating the overlap integral $\eta = \iint |H||\tilde{I}| d\omega_x d\omega_y$, where the integration is over the spectral domain $(\omega_x, \omega_y)$, and the degree of defocus can be obtained by maximizing the overlap integral $\eta$. An important advantage of the spectral approach, following from the Fourier transform theorems, is that $|\tilde{I}|$ remains invariant when the object of interest shifts laterally. This makes the OTF based method applicable for ranging of moving objects, or, dynamic ranging. In the physical domain the object shift results in a significant complication of the deconvolution step.

Figure 5:
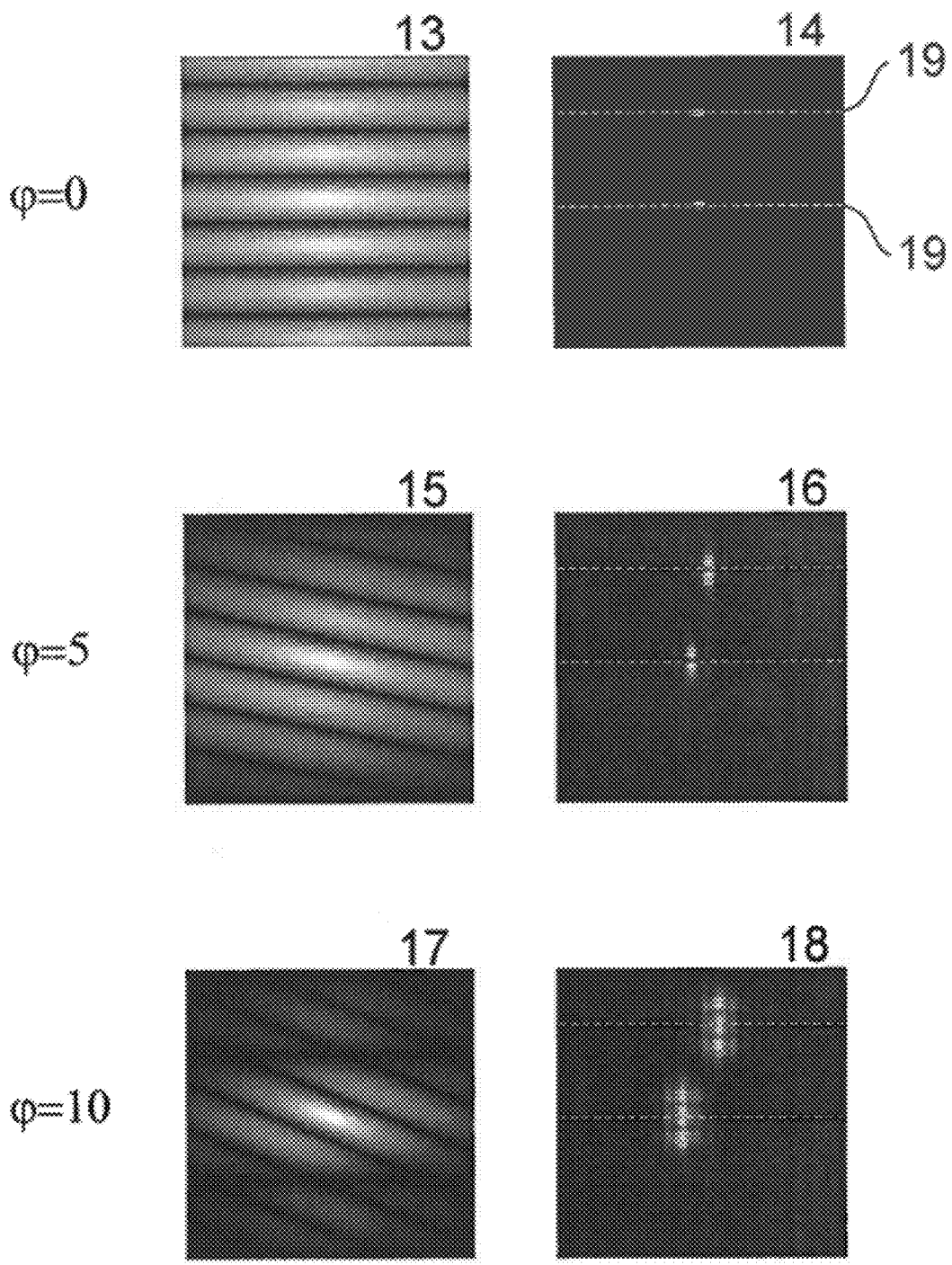
FIG. 5 illustrates evolution of the defocus-dependent OTF and the corresponding PSF of the chiral optical mask, in this example, the amplitude function of the mask is defined by $$p(x, y) = \begin{cases} 1, & |x| \le 1 \text{ and } |y| \le 1 \\ 0, & \text{otherwise} \end{cases}$$

Third, the rotating PSF according to US2008/0137059 is (quote) "related to a class of propagation-invariant rotating beams, which are obtained by superposing optical modes that fall along a line in the Gauss-Laguerre modal plane." The optical rangefinding described in the present document does neither require propagation-invariant rotating beams nor rely on any specific constrains in the modal plane. As an example, FIG. 5 in the present document shows the PSF evolution calculated for a half-aperture prismatic optical mask which is considered to be one of the preferred embodiments of the optical arrangement in the present document. As clearly seen from FIG. 5, the system PSFs 14, 16, 18 are propagation-variant light distributions that evolve in a complicated manner with defocus: PSF evolution includes horizontal shift of the PSF lobes along the reference lines, their diffraction and scaling.

Fourth, the prior invention US2008/0137059 requires rotating PSFs for defocus evaluation and following range calculation. In the present document, rotating PSFs are not required and defocus is directly derived from the displacements of the OTF, H. The man skilled in the art may conclude that for an imaging system having close to diffraction-limited performance, i.e. the PSF is well-localized function, the displacements caused by defocus can be determined much accurately in the spectral domain rather than in the physical domain. For example, FIG. 6 of the present document illustrates the spatial response of a parabolic screw mask. As clearly seen from FIG. 6, changes in defocus result in distinct rotation of the central structure of the MTF, see 20, 23 and 26. At the same time, the PSFs 22, 25 and 28 hardly reveal any changes except of directional elongation.

Fifth, the US2008/0137059 method includes a mask which maximizes Fisher information while the present invention includes a chiral mask which induces chirality. To predict and optimize the optical response of the rotating PSF system according to US2008/0137059, a complex numerical analysis is required, including several severe constrains, e.g. centration of the wave modes around a line in the GL plane, rotational-invariance etc. On the contrary, the chiral mask response is easy to evaluate and optimize. In many practical cases, the OTF can be found analytically. For example, the OTF a half-aperture prismatic optical mask and its dependency on defocus and steepness of the prismatic part are derived in the section "Analytical framework" of the present document.

Sixth, as follows from documents US2008/0137059, the rotating PSF system is characterized by a low light efficiency caused by the amplitude part of the rotating PSF transfer function, unused diffraction components and light scattering to the side lobes. In practice, the transfer function efficiency of ~1.8% is achieved with the exact rotating PSF mask. The alleviated constraints on the 3D rotating PSF response have resulted recently in a new high-efficiency rotating PSF design yielding a theoretical efficiency of ~56.8%. However, those skilled in the art may conclude that the optimization of the coherent optical response without additional restrictions on the phase of the 3D amplitude PSF and on the discontinuities of the coherent transfer function leads to diffraction artifacts and scattering of light. According to US2008/0137059, (quote) "the phase singularities at appropriate locations are principally responsible for the rotation of the PSF". This fundamentally limits the efficiency of the rotating PSF system. On the contrary, the efficiency (using the Parseval theorem, the efficiency can be determined as a ratio of the energy in the region of the spatial spectrum with usable characteristic pattern to the whole energy in the spatial spectrum) of the OTF based approach described in the present document may reach 100%. For example, in a low numerical aperture (NA) system, the image spectrum is localized at low spatial frequencies and can be completely covered by a characteristic pattern. Defocusing causes displacement of the pattern, but the whole pattern structure remains usable for defocus evaluation.

Seventh, the present document describes, by means of an example and formulas, in the section "Analytical framework", the method for obtaining the in-focus image of an object from the, likely blurred, image detected by the photosensor which methods are not disclosed for rangefinder apparatus according to US2008/0137059.

Eighth, the rangefinding apparatus and methods for optical rangefinding according to US2008/0137059 include multiple optical masks and require multiple images of the distant object. In the present document, optical rangefinding can be accomplished with only one image of the object and without additional optical elements, i.e. optical masks, at all, for example, the optical arrangement shown in FIG. 12 comprises a pair of concave mirrors for imaging and the effect of chirality is introduced by relative tilting the mirrors.

U.S. Pat. No. 7,218,448B1 describes a system and methods for passive ranging which differ in key aspects including physical principle, design and embodiments from the passive optical rangefinder presented in this document. Several, but not necessarily all, differences are: First, none of the optical arrangements or mask designs (including the linear phase modulation mask with two prisms) disclosed in the document U.S. Pat. No. 7,218,448B1 is a chiral optical arrangement or chiral optical mask. Second, passive ranging according to U.S. Pat. No. 7,218,448B1 (quote) "is accomplished by modifying the incoherent optical system [ . . . ] such a way that range dependent zeros are present in the OTF," or other words (quote) "zeros are added to encode the wavefront with information on range." The method for optical rangefinding described in the present document does not require zeros in the OTF—the OTF may have irregular structure and contain no zeros, or well-defined minima. For example, the MTF cross sections 21, 24 and 27 depicted in FIG. 6 do not reveal zeros in the spectral range. This is advantageous for image reconstruction since zeros cannot be removed by any digital post filtering. At the same time the degree of defocus can be derived from the two-dimensional displacement of the central lobe of the MTF by, for example, maximizing the overlap integral $\eta=\iint|H||\tilde{I}|d\omega_x d\omega_y$, where $|H|$ is the defocus-dependent MTF and integration is performed over the spectral domain $(\omega_x,\omega_y)$. Third, passive ranging with the extended depth of field according to U.S. Pat. No. 7,218,448B1 is obtained by combining a linear phase modulation filter, producing single-lens stereograms, with the cubic phase modulation mask. In the present document the extended depth of ranging can be attained without additional elements and phase masks by using the directional sensitivity of the chiral optical arrangement, for example, by shaping the exit pupil of the optical system. It can be proven mathematically that pupil shaping, e.g. replacing an open pupil with only two small openings, may result in increase of the rangefinder accuracy and ranging depth. The only disadvantage of this approach is light reduction.

U.S. Pat. No. 5,521,695A and its continuation-in-part U.S. Pat. No. 5,870,179A differ in physical principle, design and embodiments from the passive optical rangefinder presented in this document. Several, but not necessarily all, differences are: First, none of the optical arrangements or mask designs disclosed in the documents U.S. Pat. No. 5,521,695A and U.S. Pat. No. 5,870,179A is a chiral optical arrangement or chiral mask. Second, for ranging and imaging U.S. Pat. No. 5,521,695A and U.S. Pat. No. 5,870,179A require rank deficient imaging system transformation matrix and color separation technique. Rank deficiency (an example of rank deficiency in mathematics is a decomposition, or projection, of a vector into an incomplete set of basis vectors) with respect to imaging means that the resulting image contains less information than the object and, thus, the image of the object cannot be reconstructed by any post filtering. This may be overcome by color separation when a predefined color band (or wavelength) is used for ranging, and other color bands are intended for imaging. The present invention does not require rank deficient transformation matrix and/or complex color separation technique. Moreover, in the case of the chiral optical arrangement for imaging, only one detected image is needed for simultaneous ranging and image reconstruction. Third, the U.S. Pat. No. 5,521,695A and U.S. Pat. No. 5,870,179A methods for estimating the distance to various points of the object rely on the analysis of the range-encoded image blocks. In the notations of U.S. Pat. No. 5,521,695A and U.S. Pat. No. 5,870,179A, each block, $y_i$, is a result of convolution of the corresponding object data, u, with the range-dependent "rank deficient" PSF, $H_i$, i.e. $y_i = H_i \otimes u$. Those skilled in the art may conclude that finding a set of vectors, $a_i$, such that $a_i^T y_i = 0$ and $a_i^T y_j \neq 0$, when $i \neq j$, is an ill-posted problem which may result, for example, in vectors, $a_i$, dependent not only on the range to a particular section, u, of the object, but also on the object structure (since $y_i$ depends on u). In the present invention, the object-related artifacts limiting the ranging precision are removed by an additional optical mask/optical arrangement, or algorithmically, as described in the present document. Fourth, as follows from the description, U.S. Pat. No. 5,521,695A and U.S. Pat. No. 5,870,179A employ the sampled PSF (even under-sampled since the imaging system is a rank deficient) with a number of discrete regions L. This means that the resulting range-encoded image block, $y_i$, is a superposition of L weighted PSF values $h_0 \ldots h_{L-1}$, and the resulting intensity distribution in $y_i$ deviates from those that can be obtained with a continuous PSF. Such a deviation fundamentally limits the system precision. On the contrary, in the present invention the PSF remains continuous and the system precision is limited only by the size of the image.

Analytical Framework

The method for optical rangefinding requires, at least one, optical mask positioned inside or outside an optical system, preferably in the plane of the exit pupil, to modulate the phase and the amplitude of the incoming light. The optical mask can be designed as a separate element, or as part of the optical system, or the photosensor, or a part of any element of the optical system, for example, a relay lens with a modified surface. The optical mask is completely characterized by its amplitude and phase functions. In the simplest embodiment of the rangefinder, the light after passing the mask is registered by a photosensor in the image plane which is specified by the system design and, generally, does not coincide with the in-focus image plane of the optical system for the distance range of interest. Alternatively, the light can be registered by the photosensor positioned in plane representing the spatial spectrum of the image, for example, in the output plane of the optical processor described in U.S. Pat. No. 4,556,950, which document is included in the present document by reference.

Consider an optical mask is in the plane of the exit pupil. In Cartesian coordinates with the Z axis along the optical axis of the optical system, and the X and Y axes perpendicular to the optical axis and lying in the plane of the exit pupil, the complex transmission of the mask can be expressed by $$P(x,y)=p(x,y)\exp[i\theta(x,y)], \quad (1)$$

where $p(x,y)$ is the amplitude transmission function and $\theta(x,y)$ is the phase function. Note that, in the specified geometry, the complex transmission according to Eq. (1) coincides with the generalized pupil function.

Using the reduced coordinates (H. H. Hopkins, Proc. Roy. Soc. of London, A231, 91-103, 1955) and assuming that the focusing error caused by defocus amounts to $\phi$, the incoherent optical transfer function (OTF) as a function of the reduced spatial frequencies $\omega_x$ and $\omega_y$, $|\omega_x|$, $|\omega_y|\leq 2$, becomes (H. H. Hopkins, Proc. Roy. Soc. of London, A231, 91-103, 1955)

$$H(\omega_x,\omega_y,\varphi) = \frac{1}{\Omega}\int_{-\infty}^{\infty}\int_{-\infty}^{\infty} P\left(x+\frac{\omega_x}{2}, y+\frac{\omega_y}{2}\right) \quad (2)$$

$$P^*\left(x-\frac{\omega_x}{2}, y-\frac{\omega_y}{2}\right)\exp[i2\varphi(\omega_x x+\omega_y y)]dxdy,$$

here $\Omega$ is the total area of the pupil in reduced coordinates $$\Omega = \int_{-\infty}^{\infty}\int_{-\infty}^{\infty}|P(x,y)|^2 dxdy. \quad (3)$$

Specifying the spatial spectrum of the object as the Fourier transform of the object intensity distribution $$I_0(\omega_x,\omega_y) = \frac{1}{2\pi}\int_{-\infty}^{\infty}\int_{-\infty}^{\infty}I_0(x',y')\exp[-i(\omega_x x'+\omega_y y')]dx'dy', \quad (4)$$

where x' and y' are the transverse coordinates in the object plane and $I_0(x',y')$ is the intensity distribution that characterizes the object, the spectrum of the image (in the image plane) takes the form (J. W. Goodman, *Introduction to Fourier Optics*, McGraw-Hill Co., Inc., New York, 1996)

$$I_i(\omega_x,\omega_y)=H(\omega_x,\omega_y,\phi)I_0(\omega_x,\omega_y). \quad (5)$$

Thus, the spatial spectrum of the image is a product of the object spectrum and the OTF of the optical system with defocus. Note, that Eq. (5) is valid for isoplanatic imaging, or, equivalently, imaging with space-invariant optical system. Note that the effects of anisoplanatic imaging can be similarly described in terms of anisoplanatic transfer function (ATF).

The focusing error $\phi$ can be expressed, for example, as follows $$\varphi = \frac{\pi D^2}{4\lambda}\left(\frac{1}{f}-\frac{1}{z_o}-\frac{1}{z_i}\right), \quad (6)$$

where D is the diameter of the exit pupil; $\lambda$ is the wavelength; f is the back focal length; $z_o$ is the unknown a priori distance from the object to the first principal plain of the optical system; $z_i$ is the distance between the second principal plane and the image plane.

The complex function $P(x,y)$ has to be chosen such that the image spectrum $I_i(\omega_x,\omega_y)$, given by Eq. (5), converts defocus changes into detectable displacements of the spectrum features. The spectrum features, or a characteristic pattern of the spectrum, should be easily detectable and permit unambiguous quantitative determination of the focusing error $\phi$ from theses displacements. Among possible displacements of the spectrum features are lateral shift, rotation and scaling. Complex displacements including combinations of lateral shift, rotation and scaling are also admissible as soon as they allow quantitative determination of defocus irrespectively the spatial spectrum of the object $I_0(\omega_x,\omega_y)$.

To obtain detectable displacements resulting from the focusing error $\phi$ and create a characteristic pattern in the spatial spectrum of the image, the phase function $\theta(x,y)$ can be chosen, at least in part, as a chiral prismatic function. The amplitude function $p(x,y)$, in this case, has to be adapted to produce distinct characteristic features in the spatial spectrum of the image, which features allow an unambiguous and quantitative characterization of the displacements in the spatial spectrum of the image. However, not all combinations of $p(x,y)$ and $\theta(x,y)$ are suitable for this purpose. For example, with $$p(x,y) = \begin{cases} 1, & x^2+y^2\leq 1 \\ 0, & x^2+y^2>1 \end{cases} \quad (7)$$

and $$\theta(x,y)=A\times\arctan(y/x) \quad (8)$$

where A is the constant, the inherent spectral response of the optical mask defined as $|H(\omega_x,\omega_y,\phi)|$ contains only rotationally symmetric characteristic features, which features do not rotate or shift versus $\phi$.

For most combinations of $\theta(x,y)$ and $p(x,y)$, the analytical expression for $H(\omega_x,\omega_y,\phi)$, given by Eq. (2), can not be found explicitly. In the same time, numerical simulations can be carried out to predict spectrum displacement caused by defocus. Alternatively, a fully assembled optical system with the properly designed mask can be calibrated with a set of objects positioned at different distances from the rangefinder. With a discreet set of the experimentally registered degrees of displacements corresponding to a discreet set of distances an intermediate distance can be evaluated by, for example, interpolating the calibration data.

Quantitative determination of the focusing error $\phi$ requires comparison of the spatial spectrum of the image with a reference pattern specified at any known a priori defocus. For illustrative purposes, the characteristic pattern, defined here as the modulus of the OTF and evaluated at $\phi=0$, is used below. In this case, the degree of displacement can be found by comparing $|H(\omega_x,\omega_y,0)|$ with $|I_i(\omega_x,\omega_y)|$. The degree of defocus is evaluated by comparing $|H(\omega_x,\omega_y,\phi)|$ with $|I_i(\omega_x,\omega_y)|$, where $\phi$ is adjusted to get the closest match between $|H(\omega_x,\omega_y,\phi)|$ and $|I_i(\omega_x,\omega_y)|$. In many cases, but not always, the best match between $|H(\omega_x,\omega_y,\phi)|$ and $|I_i(\omega_x,\omega_y)|$ can be found by, for example, maximizing the overlap integral $$\eta(\phi)=\iint|H(\omega_x,\omega_y,\phi)|\times|I_i(\omega_x,\omega_y)|d\omega_x d\omega_y, \quad (9)$$

where the integration is over the usable spectral domain. The maximum of $\eta(\phi)$ is reached when $\phi$ coincides with the unknown defocus. More complex comparison methods can be used, for example, based on moment analysis, Fourier transformation (in case the inherent spatial response of the optical mask is a periodic function), circular harmonic correlation (see, J. W. Goodman, *Introduction to Fourier Optics*, McGraw-Hill Co., Inc., New York, 1996) etc.

Once the focusing error φ is found the in-focus image of the object, or equivalently the spectrum of the object, can be calculated. For example, using Eq. (5), the simplest inversion method requiring, however, a large signal-to-noise premium, results in the following object spectrum (J. W. Goodman, *Introduction to Fourier Optics*, McGraw-Hill Co., Inc., New York, 1996)

$$I_0(\omega_x, \omega_y) = \frac{I_i(\omega_x, \omega_y)H^*(\omega_x, \omega_y, \varphi)}{|H(\omega_x, \omega_y, \varphi)|^2 + \varepsilon}, \qquad (10)$$

where the constant $\epsilon^{-1}$, by analogy with the least-mean-square-error filter (Wiener filter), denotes the signal-to-noise ratio. The in-focus image of the object is then calculated with the inverse Fourier transformation.

Optical arrangements, or, alternatively, optical masks with chiral structure that do not introduce zeros in a relatively wide region of the spatial spectrum are of interest for imaging applications. An example of the optical mask that allows determination of the focusing error and facilitates image reconstruction is a parabolic chiral optical mask defined (in the exit pupil plane) by the phase function $$\theta(r,\alpha) = Ar^2\alpha \qquad (11)$$

where θ of the mask is defined in polar coordinates (r,α) with the origin in the centre of the exit pupil. It can be shown that at small spatial frequencies, $\omega_r \ll 1$, the OTF becomes $$H(\omega_r, \omega_\alpha, \phi) \sim 1 - iA\pi \sin(\omega_\alpha + \phi/A), \qquad (12)$$

where $(\omega_r, \omega_\alpha)$ is the spatial frequency in polar coordinates, $\omega_r = \sqrt{\omega_x^2 + \omega_y^2}$; and $\omega_\alpha = \arctan(\omega_y/\omega_x)$. So, as clearly seen from Eq. (12) the central lobe of the OTF linearly rotates with defocus φ. This effect is illustrated by the MTFs in FIG. 6. The OTF $H(\omega_r, \omega_\alpha, \phi)$ has no zeros in a wide region of $\omega_r$ (the higher A, the wider this region) and, thus, $H(\omega_r, \omega_\alpha, \phi)$ can be inverted without excessive noise amplification at a wide range of spatial frequencies. The image of the object can be obtained, for example, by Eq. (10). It worth noting that if $A \to \infty$, $\partial H/\partial \phi = 0$ and the optical system becomes insensitive to defocus.

An Example: Apparatus with a Half-Aperture Prismatic Optical Mask

Among the simplest implementations of the optical masks which, firstly, create distinct features in the image spectrum and, secondly, make position and size of the spectrum features dependent, in a certain way, on defocus is a rectangular aperture with a half-aperture prismatic element. The amplitude function of the mask is given by $$p(x, y) = \begin{cases} 1, & |x| \le 1 \text{ and } |y| \le 1 \\ 0, & \text{otherwise,} \end{cases} \qquad (13)$$

and the phase function is specified as $$\vartheta(x, y) = \begin{cases} Ay, & x \ge 0 \\ 0, & x < 0. \end{cases} \qquad (14)$$

It is obvious that θ(x,y) according to Eq. (14) is a chiral function.

Assuming for simplicity that $|\omega_x| \le 1$ and $|\omega_y| \le 2$, the integration according to Eq. (2) with the mask specified by Eqs. (13, 14) results in the OTF which can be represented as a combination of three terms $$H(\omega_x,\omega_y,\phi) = H_I(\omega_x,\omega_y,\phi) + H_{II}(\omega_x,\omega_y,\phi) + H_{III}(\omega_x,\omega_y,\phi) \qquad (15)$$

coming from: (I) the intersection of two flat half-apertures $$H_I(\omega_x, \omega_y, \varphi) = \frac{\exp(-i\varphi\omega_x)}{4\varphi^2 \omega_x \omega_y} \sin(\varphi\omega_x[1-|\omega_x|])\sin(\varphi\omega_y[2-|\omega_y|]), \qquad (16)$$

(II) the intersection of flat and prismatic half-apertures $$H_{II}(\omega_x, \omega_y, \varphi) = \qquad (17)$$
$$\frac{\exp(iA\omega_y/2)}{2\varphi\omega_x(A+2\varphi\omega_y)} \sin(\varphi\omega_x|\omega_x|)\sin([2-|\omega_y|][A/2+\varphi\omega_y]),$$

and (III) the intersection of two prismatic half-apertures $$H_{III}(\omega_x, \omega_y, \varphi) = \qquad (18)$$
$$\frac{\exp(i[A\omega_y+\varphi\omega_x])}{4\varphi^2 \omega_x \omega_y} \sin(\varphi\omega_x[1-|\omega_x|])\sin[\varphi\omega_y(2-|\omega_y|)].$$

After substituting Eqs. (16-18) into Eq. (15) the defocused OTF of the optical system with a half-aperture prismatic mask takes the form $$H(\omega_x,\omega_y,\phi) = \{a + 2b \cos(\phi\omega_x + A\omega_y/2)\}\exp(iA\omega_y/2), \qquad (19)$$

where the real coefficients a and b are $$a = \frac{\sin(\varphi\omega_x|\omega_x|)\sin([2-|\omega_y|][A/2+\varphi\omega_y])}{2\varphi\omega_x(A+2\varphi\omega_y)}, \qquad (20)$$

$$b = \frac{\sin(\varphi\omega_x[1-|\omega_x|])\sin[\varphi\omega_y(2-|\omega_y|)]}{4\varphi^2 \omega_x \omega_y}. \qquad (21)$$

As follows from Eq. (19), the OTF contains a periodic structure, the said pattern of lines, which structure does not depend on the object structure at all, but is sensitive to defocus. This periodic structure can be treated as a pattern of lines created largely by "interference" of $H_I(\omega_x,\omega_y,\phi)$ and $H_{III}(\omega_x, \omega_y,\phi)$. Note that at $\phi \to 0$ and $A \to 0$, the OTF simplifies to $$H(\omega_x,\omega_y,\phi=0) = (1-|\omega_x|/2)(1-|\omega_y|/2), \qquad (22)$$

which is the OTF of a diffraction-limited system with a square pupil.

The phase of the cosine term in Eq. (19) is represented by a linear function of spatial frequencies $\omega_x$ and $\omega_y$ $$\Phi = \phi\omega_x + A\omega_y/2. \qquad (23)$$

Introducing polar coordinates $(\omega_r, \omega_\alpha)$ according to $$\begin{cases} \omega_x = \omega_r \cos\omega_\alpha, \\ \omega_y = \omega_r \sin\omega_\alpha, \end{cases} \text{ and } \begin{cases} \omega_r = \sqrt{\omega_x^2 + \omega_y^2}, \\ \omega_\alpha = \arctan(\omega_y/\omega_x), \end{cases} \qquad (24)$$

Eq. (23) can be rewritten $$\Phi = \omega_r \sqrt{\phi^2 + A^2/4} \cos(\omega_\alpha - \beta), \qquad (25)$$

where $\beta=\arctan[A/(2\phi)]$ is the angle perpendicular to the line pattern.

From Eq. (25), it follows that the line pattern is rotated by the angle $\omega_\alpha=-\pi/2+\beta$ about the origin ($\omega_\alpha<0$ when $A>0$ and $\phi>0$). At $\omega_\alpha=\beta$ the spatial period T of the line pattern structure reaches its minimum $$T=2\pi/\sqrt{\phi^2+A^2/4}. \quad (26)$$

So, the pattern orientation specified by the angle $$\omega_\alpha=-\pi/2+\arctan[A/(2\phi)] \quad (27)$$

and its spatial period, given by Eq. (26), vary, in a known manner, with the focusing error $\phi$.

According to Eq. (19) we have $|H(\omega_x,\omega_y,\phi)|\sim\cos(2\phi\omega_x+A\omega_y)$ and the overlap integral $\eta(\phi)$ given by Eq. (9) can be expressed as a Fourier integral $$\eta(\phi)=Re\{\iint|I_i(\omega_x,\omega_y)|\times\exp[i(2\phi\omega_x+A\omega_y)]d\omega_xd\omega_y\} \quad (28)$$

that can be easily computed by the Fast Fourier Transformation (FFT) method.

Equation (28) can be further simplified if we replace $|I_i(\omega_x,\omega_y)|$ by $|I_i(\omega_x,\omega_y)|^2$ and note that $|H(\omega_x,\omega_y,\phi)|^2\sim\cos(2\phi\omega_x+A\omega_y)$. Introducing $u=2\phi$, the defocus direction, and $v=A$, the prismatic steepness direction, and using the definition of the Fourier transform, e.g. Eq. (4), the new overlap integral $\eta'(u,v)$ takes the form $$\eta'(u,v)=Re\{\iint|I_i(\omega_x,\omega_y)|^2\times\exp[i(u\omega_x+v\omega_y)]d\omega_xd\omega_y\}=\iint I_i(x+u/2,y+v/2)I_i(x-u/2,y-v/2)dxdy \quad (29)$$

which is, by definition, the image autocorrelation function. By maximizing $\eta'(u,v)$ with respect to $u=2\phi$, the unknown degree of defocus $\phi$ can be found. Note that $\eta'(u,v)$ is a symmetrical function, $\eta'(-u,-v)=\eta'(u,v)$, which results in two maxima, or two autocorrelation lobes, for the mask according to Eqs. (13, 14). Equation (29) is preferable when the prismatic steepness $v=A$ is not precisely defined. In this case, prior to maximizing, the function $\eta'(u,v)$ can be averaged over v. An alternative approach is to fit one autocorrelation lobe with, for example, an elliptical paraboloid (having a distinct maximum). Then, by applying the least-mean-square-error method the coordinates of the maximum can be determined and, thus, the unknown defocus and steepness A can be found. This approach has been successfully implemented in a rangefinder prototype.

The present disclosure provides an optical rangefinder comprising an imaging system adapted to project an image and to modulate the light beam of at least one object on the photosensor, for example, a CCD sensor which sensor is adapted to transform the image projected onto it into a corresponding electronic image or, alternatively, separate processing means coupled to the sensor to accomplish said image transformation step. The invention also includes spectral processing means adapted to provide the spatial spectrum of said image by spectral decomposition and defocus processing means adapted to derive the distance from the object to the rangefinder based on the degree of defocus of the image. The imaging system includes at least one optical arrangement, located in the optical path of the imaging optics, to modulate the light beam such that defocus of the image of the at least one object in the image plane relative to the in-focus image plane results in displacement of the spatial spectrum of the image relative to a reference pattern. Additional processing means directly derive the degree of defocus of the image of the object in the image plane relative to the in-focus image plane from said degree of displacement of the spatial spectrum relative to the reference pattern. The reference pattern (see also the section Terms and definitions) is a pattern in the spatial spectrum domain that can be used as a reference scale to measure the degree of displacement of the image spectrum caused by defocus. The term directly derive refers to a direct comparison of the image spectrum with, for example, a single line, or a grid of lines, or a pattern of lines, without additional processing steps such as, for example, deconvolution.

Processing means perform conversion of the image projected on the photosensor into a digital image that can be processed digitally, stored, or displayed by an appropriate digital processor, e.g. a personal computer. Processing means also perform spectral decomposition of the image. The spectral decomposition can be accomplished by digital algorithms from the digital image, or alternatively, directly from the image in the image plane by an optical processor, for example, the optical processor described in U.S. Pat. No. 4,556,950. Processing means also provide conversion of the degree of defocus into distance, for example, by computing according to Eq. (6).

Additional processing means perform a novel task specific for the invention described in the present document and are adapted to provide the degree of defocus of the image of the object in the image plane relative to the in-focus image plane from the displacement of said spatial spectrum relative to the reference pattern represented, for example, by the inherent spectral optical response of the optical mask, which is known a priori. The additional processing means may include an optical-mechanical assembly to estimate the degree of defocus by visual evaluation by an observer, or, more likely, an electronic processing means and corresponding software to estimate the degree of defocus automatically.

All the processing steps described herein can be implemented using optical-mechanical methods by, for example, a set of optical elements and mechanical sliding or rotating scales and visual inspection by an observer. For example, the processing step to calculate distance from defocus can be accomplished with a traditional calculation ruler. Alternatively, said processing can be electronic by digital or analogue electronic means which, for example, evaluate the overlap integral, or cross correlation, between the defined reference pattern and the image spectrum as a function of a displacement parameter. Clearly, said calculations, processing and estimations can, of course, in modern times, best be provided by digital electronic means. Only when the spatial structure of distant object is known a priori or can be described as a set of simple geometric forms the degree of defocus can be evaluated directly from the degree of displacement of the images on the photosensor. For example, the half-prismatic mask defined by Eqs. (13, 14) results in a 'double' image of the distant object in the image plane. The spacing between the object images and their relative rotation depend on the steepness A of the prismatic mask and defocus $\phi$. Thus, the unknown defocus can be calculated from the degree of rotation of, for example, the centers of mass of the images by Eq. (27). More generally, Eq. (29) allows evaluation of defocus (for any distant object) by maximizing the image autocorrelation function in the defocus direction. The image autocorrelation, in turn, can be calculated directly or by, for example, the FFT method, or other methods including digital and hardware processing of the image. The processing steps can include individual processing means (e.g. dedicated electronic processors) or all the processing steps can be combined in a single processing means (one processor). The non-iterative nature of the calculations forwarded in the present document allows for high speed of processing which is important for speed and distance measurements of objects as well as imaging of the objects moving at high velocities.

The spatial spectrum of the image on the photosensor can be obtained by discrete Fourier transformation of the electronic image. The comparison of the image spectrum with a reference pattern represented, for example, by the characteristic pattern, e.g. the MTF, can be made by, for example, calculating the overlap integral of these spectra. Maximization of the overlap integral results in an estimate of the relative displacement, which displacement can be converted into defocus, and by recalculating according to Eq. (6), or, for example, as described by Nayar (Nayar et al., Proc. of Fifth Intl. Conf. on Computer Vision, 995-1001, Cambridge, Mass., USA, 1995) the distance of an object from the rangefinder can be evaluated.

Those skilled in the art may note that the spatial spectrum of the image depends on the spatial structure of the object and the spectral response of the optical system. Strong artifacts in the image spectrum caused by the object spatial structure (e.g. spatial periodicity), may hamper the detection and estimation of the displacements in the image spatial spectrum and, thus, deteriorate the accuracy of the rangefinder. To get rid of the object-related features in the spatial spectrum, an additional optical mask can be combined with the main optical mask. This additional mask should be designed with regular or random phase or/and amplitude structure to homogenize the object-related spectral features over the whole spectrum band. Other optical elements, for example, hollow reflective light guides, and optical-mechanical arrangements, for example, to rotate the whole rangefinder axially, can be used to smear the object-related spectral features. Alternatively, an algorithmic post processing of the image spectrum can be employed to reduce the effect of image artifacts. For example, assuming that in the spectral range of interest as $|\partial a/\partial \omega_y| \ll 1$ and $|\partial b/\partial \omega_y| \ll 1$ (see Eqs. 20, 21), from Eq. (19) it follows that $H(\omega_x, \omega_y, \phi) \cong H(\omega_x, \omega_y + 4\pi q/A, \phi)$, where A is the known prismatic constant, q is the integer number, $-N \leq q \leq N$, $N = \lfloor A\omega_{max}/(4\pi) \rfloor$ and $\omega_{max}$ is the maximum spatial frequency. Using Eq. (5), we introduce a "synthetic" spectral function $$S(\omega_x, \omega_y, \varphi) = \sum_{q=-N}^{N} I_i\left(\omega_x, \omega_y + \frac{4\pi q}{A}\right) = \sum_{q=-N}^{N} H\left(\omega_x, \omega_y + \frac{4\pi q}{A}, \varphi\right) I_0\left(\omega_x, \omega_y + \frac{4\pi q}{A}\right) \cong H(\omega_x, \omega_y, \varphi) \sum_{q=-N}^{N} I_0\left(\omega_x, \omega_y + \frac{4\pi q}{A}\right). \quad (30)$$

When $N \gg 1$ the last term in Eq. (30) weakly depends on $\omega_y$ and does not produce the pronounced object-related artifacts in $S(\omega_x, \omega_y, \phi)$.

The optical arrangement mentioned above can, for example, include at least one chiral optical arrangement adapted to provide a degree of displacement of the spatial spectrum depending on the degree of defocus of the image. Such chiral optical arrangement can include, for example, at least one chiral optical mask which can include at least one chiral optical surface. Alternatively, a chiral optical arrangement can include any optical components that make the optical system chiral.

The optical mask, in one exemplary basic embodiment, as set forth in the present document, is a traditional transparent refractive optical element, generally, with multiple discrete or continuous sub-areas. However, said optical mask can derive said functionality from transmission/refraction (e.g. transparent prismatic optics, likely manufactured from glass or transparent polymer), but also reflection (e.g. the optical masks being mirrors of specified prismatic shape), periodic phase and amplitude structures (e.g. the masks being phase and amplitude gratings effecting specified prismatic shape), holograms including computer generated holograms, for example, a detour computer generated optical hologram for specific applications to provide a chiral effect with only an amplitude mask, and diffraction optical elements and other optical embodiments, including GRIN type optics, which result in the various functionalities described herein.

The optical mask can be defined in terms of the corresponding amplitude and phase functions describing, respectively, the intensity and phase modulation of the transmitted light. The optical mask must be designed such that the amplitude function in combination with the phase function provides a non-uniform spectral response of the optical system, e.g. the MTF, preferably with highly accentuated features. Moreover, the configuration and spatial structure of this non-uniform spectral response have to be dependent, in a known manner, on the degree of defocus.

The chiral optical arrangement described above gives rise to a chiral modulation of the light beam approaching the photosensor. The chiral modulation, in turn, can result in directional sensitivity, or, alternatively, directional resolution, which is an increased sensitivity along one preferential axis in combination with decreased sensitivity along an opposite axis and, consequently, chiral arrangements can be designed such that sensitivity can significantly exceed the diffraction limit along at least one axis. The directional sensitivity also allows for extending the dynamic range of the rangefinder, for example, by stopping down the system aperture in the direction perpendicular to the measurement direction. For example, it was shown experimentally that in the optical system with an optical mask according to Eq. (13, 14) an additional slit diaphragm along the X-axis significantly increases the range of distance measurements and improves the sensitivity of the measurements.

An Example of the Optical Mask: A Chiral Optical Element

Figure 3:
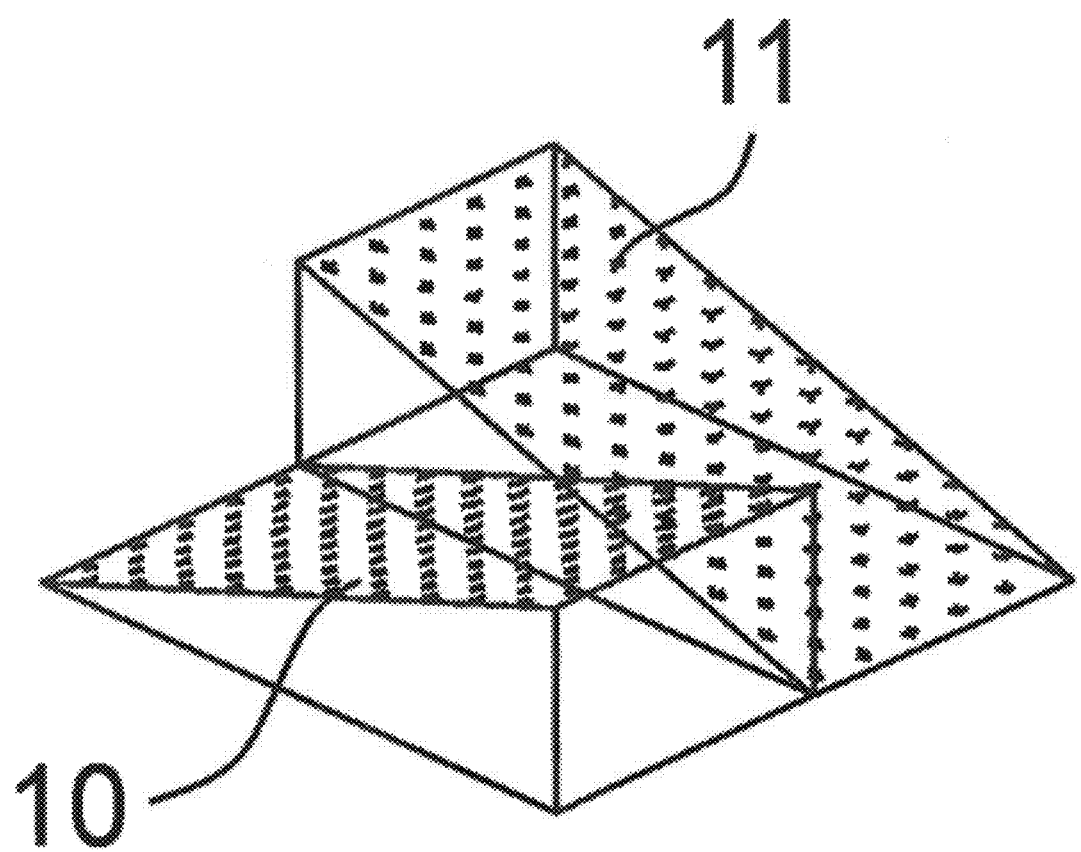
FIG. 3 shows an optical mask with two prismatic elements, in this example, with a square aperture. The mask comprises two prismatic elements, 10, and 11, resulting in a chiral structure of the mask.
Figure 4:
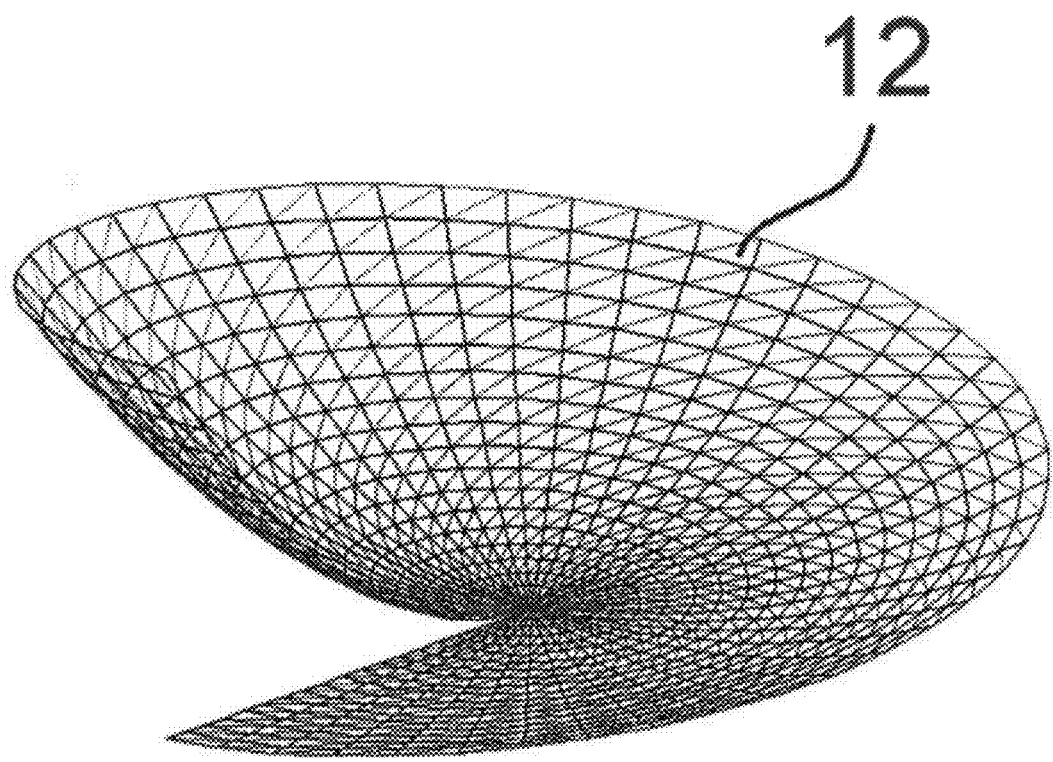
FIG. 4 shows an optical mask with a parabolic screw surface, 12, in this example, defined within a circular aperture by $z=Ar^2\alpha$, where z is the surface sag, r is the radial coordinate, $\alpha$ is the polar angle in the plane of the mask, and A is the mask steepness.

The phase function of the optical mask can be chosen to provide chiral modulation of light. This effect can be achieved with a mask having, for example, a chiral refractive surface, which surface can be either in discrete steps, for example, a prismatic chiral arrangement (for example, as in FIG. 2-3) or continuous, for example the parabolic chiral arrangement (for example, as in FIG. 4), described and illustrated in the present document.

Chiral surfaces are generally of complex designs. However, in the present document a simple discrete mask design with a chiral functionality is described for rangefinding which comprises a prismatic refractive surface covering only part of the mask aperture. This design can be naturally generalized to the case of multiple prismatic surfaces covering the whole mask aperture, or only part of it.

An example of the optical mask with a chiral prismatic surface is a square aperture mask with a prism covering one half of the aperture (the wedge is along the side of the mask) and a flat surface that covers another half of the mask. Another example is the mask with rectangular shape and optical surface represented by a helical surface.

Note that the angular steepness (in this context the partial derivative with respect to the polar angle) of the chiral prismatic surface can vary depending on the application and specifications of said surface, e.g. said steepness can be linear or non-linear functions. Similarly, the radial steepness (the partial derivative with respect to the radius) can be designed depending mostly on additional requirements, for example, the mask might include an additional spherical surface to change the focal distance of the imaging system. In general, one optical mask can comprise any number of such surfaces representing any combination of chiral prismatic surfaces, but at least one, with non zero angular steepness.

Those skilled in the art may conclude that chiral prismatic surfaces can be provided by various means, for example an aperture covered, only in part, by a prism, an aperture covered, only in part, by a combination of parabolic or spherical surfaces, which, in combination, might result in prismatic effect (for example, two parabolic surfaces shifted laterally produce variable tilt). Also, two prisms, positioned back-to-back and rotated by a certain degree can provide a variable prism depending on the degree of rotation, which variable prism can also cover part of the aperture and create a chiral prismatic surface. Clearly, chiral surfaces can be obtained by a variety of components and constructions and the choice of the component or construction depends on the design of the complete rangefinding apparatus. Various spatial phase modulators (e.g., liquid-crystal based devices) or deformable mirrors can be directly applied to produce chiral phase modulation. From a practical point of view, use of standard optical elements to achieve chiral functionality is of the most interest since it greatly simplifies the fabrication of such components.

Note that color/spectral filters can be included into the mask design. Application of such filters allows subsequent imaging and evaluation of images based on their wavelength, or, alternatively, wavelength ranges. Color images can be detected by, for example, a photosensor with Bayer color filter pattern.

The prismatic (chiral) optical masks described above reveal directional sensitivity. This means that, for example, an optical mask according to Eqs. (13, 14) allows detecting one-dimensional defocus represented (in the plane of the exit pupil (by $W_x = \phi x^2$, where $\phi$ is the focusing error, and the X axis is perpendicular to the boundary between the prismatic and flat regions of the optical mask. Applications of the directional sensitivity include remote sensing of the object shape and selection of an individual object from a group of objects on the scene.

The directional sensitivity described above allows further improvement of the rangefinder accuracy by adjusting the phase and amplitude functions of the mask in the direction perpendicular to the sensing direction. For example, by adding a cubic term $\gamma y^3$, where $\gamma$ is the constant, to the phase function $\theta(x,y)$, given by Eq. (14), or, alternatively and preferably, reducing the aperture of the optical system in the direction along the Y axis, the characteristic pattern (line pattern) becomes more pronounced and evenly distributed over the spatial frequency domain $(\omega_x, \omega_y)$. This might greatly facilitate the precise determination of the displacements in the image spectrum, and, thus improve accuracy, and significantly increase the dynamic range of the rangefinder.

Chiral optical arrangements and chiral optical masks can be applied for super resolution imaging, i.e. imaging providing optical resolution that exceeds the diffraction-limited resolution for a given optical system. The extension and contrast of spectral features obtained in the optical system with a chiral mask may only weakly depend on the phase distortions of the incoming light, e.g. defocus. For example, with an optical mask defined by Eqs. (13, 14), a line pattern rotates when the focusing error increases, but the length of the lines remains almost unchanged. It means that the spatial spectrum along the line pattern does not degrade with increasing defocus, and the optical resolution in this direction remains unaffected by the focusing error.

Alternatively, the optical arrangement can be, for example, a combination of at least two independent optical channels with each channel projecting an image of the object on the same photosensor. The combination of independent channels can be a chiral optical arrangement adapted to provide chiral modulation. Such arrangement can include, for example, a combination of at least two independent, and largely identical, optical channels projecting the same image on the photosensor which combination is adapted to provide a degree of displacement of the spatial spectrum correlated to the degree of defocus of the image by, for example, introduction of tilt in at least one channel versus at least one other channel, by, for example, tilting an optical element, for example, tilting an optical mirror.

Note that the precision of the measurement of the absolute focusing error is fundamentally limited by the entrance aperture of the primary optics and the distance from the primary optics to the object of interest (see, for example, C. J. R. Sheppard, J. Microsc. 149, 73-75, 1988). A higher precision requires a larger aperture, or more strictly, a larger numerical aperture, which can be effectively obtained by combining the light signals from several relatively small apertures located far apart in the direction perpendicular to the optical axis. In this case, the theoretical depth of focus, i.e. axial resolution, may eventually reach the resolution of the optical system with the aperture size equal to the maximum distance between the entrance sub-apertures. Such a large aperture can be effectively obtained by combining the outputs of several independent optical channels with equalized/adjusted optical paths. For example, a binocular system with two optical channels can be adapted to provide a single image of an object on a photosensor. The man skilled in the art may conclude that the light signals from both channels of the binocular can be combined on a single photosensor by, for example, an optical arrangement including mirrors and beam-splitters as depicted, for example, in FIG. 11. Chiral phase modulation of light can be obtained by additional phase masks positioned in each channel of the binocular, or alternatively, by relative misaligning (tilting) one channel with respect to another. This misalignment determines the effective prismatic constant A, see Eq. (14), of the resulting chiral effect. Another example, important for long-range measurements, is a system comprising two widely spaced apart concave mirrors focusing light from a distant object on a photosensor. In this case, the chiral effect can be obtained by tilting of one mirror with respect to another as shown, for example, in FIG. 12.

The optical arrangement with the independent and misaligned channels or receiving apertures has several advantages: First, the sensitivity of the rangefinder in terms of the characteristic pattern orientation see, for example, Eq. (27), can be easily adjusted by changing the degree of misalignment, e.g. tilt, of said optical channels. Second, diffraction-limited quality of imaging can be easily achieved for each small-aperture channel. Third, rangefinding of the object can be combined with subsequent imaging of the object by correcting the misalignment between the channels, i.e. when A=0.

Displacements of the spatial spectrum, or, alternatively, components of the spatial spectrum, of the image can be described in terms of the elementary geometric transformations, i.e. elementary displacements, including rotation, scaling and shift of the spatial spectrum, or components of the spatial spectrum. The displacements of the spatial spectrum can also include combination of said elementary displacements and other types of displacements not mentioned here. The combination and types of the elementary displacements and their dependency on the degree of defocus is known a priori and is stipulated by the optical arrangement, or mask design.

Rotation of the spatial spectrum is, generally, the dominant type of displacement for imaging systems having chiral optical arrangement and can be usually represented by the rotation of the characteristic pattern. However, in most cases, rotation is accompanied by other elementary displacements. For example, for an optical mask according to Eqs. (13, 14), the characteristic pattern is a pattern of lines which scales, Eq. (26), and rotates, Eq. (27), along with defocus $\phi$.

The optical arrangement should be adapted such that it provides at least one characteristic pattern in the spatial spectrum to allow for detection and evaluation of said displacements of the spatial spectrum. Such pattern can be, but is not restricted to, a pattern of lines. The optical arrangement, or, alternatively, the optical mask creates, at least one, detectable feature, in the image spectrum, which feature does not depend on the object spectrum and allows determination of the amount of displacement (correlated with defocus) versus a reference pattern.

A reference pattern can also be, for example, a characteristic pattern, as described in this document, which characteristic pattern is obtained from the inherent spectral response of the optical arrangement, or optical mask, which characteristic pattern is the spectral response of the imaging system with the optical mask, for example, the MTF obtained in the absence of defocus. The characteristic pattern represented by the inherent spectral response of the optical mask can be calculated in advance, analytically or numerically, when the amplitude function and the phase function of the optical mask are known a priory. A preferable choice for the reference pattern is the modulus of the system OTF, i.e. the MTF, calculated with the amplitude and the phase functions of the optical mask. In situations when the inherent spectral response cannot be evaluated analytically or numerically, the characteristic pattern can be generated during, for example, factory calibration of the apparatus using an object placed, for example, in the plane optically conjugate to the photosensor plane and resulting in zero defocus. FIG. 7 illustrates the generation of the generation of the inherent spectral response. More generally, a set of reference spectra obtained with different reference objects can be employed for defocus evaluation.

The characteristic pattern can be a pattern of lines. Such, periodic, pattern of lines, defined by Eq. (19), is an example of the characteristic pattern resulting from the optical mask with a chiral prismatic element, for example, a half-aperture prismatic optical mask according to Eqs. (13, 14). This pattern of lines has proven to be suitable for analysis of spectra for high resolution measurements. Clearly, displacements of, for example, a distinct set of lines can be detected and evaluated with greater accuracy compared to displacements of a blurred and/or featureless characteristic pattern.

Note that the spectral response of the prismatic optical mask see e.g. Eq. (19), can be additionally filtered out by applying an appropriate configuration of slits in the physical domain. Such an additional filter results, first, in reduction of the object-related artifacts in the image spectrum, and, second, it may greatly simplify the configuration of the photosensor.

The optical rangefinder can be adapted to provide the degrees of defocus of at least two sub-images from corresponding sub-areas of the image of the object. With the information on defocus of sub-images corresponding to multiple objects in a complex scene, or, alternatively, a single extended object can be analyzed so that, for example, the optical rangefinder can provide a defocus map, comprising the degree of defocus for each sub-image independently, and, subsequently, provide a depth-map, comprising the distances from the sub-sections of the object to the rangefinder independently.

In addition, the optical rangefinder can also be adapted to provide a wavefront map, in which the wavefront is constructed from the degrees of defocus corresponding to said sub-images. Construction of the continuous wavefront map can be carried out analogously to the wavefront construction methods developed for Shack-Hartmann wavefront sensors.

Static and dynamic defocus maps, depth maps and wavefront maps are relatively novel aids of importance for military and home-security applications because of additional options for optical, and generally passive, detection of movement and speed of objects and changes in wavefront characteristics.

Since both the amplitude (recalculated from the light intensity for each sub-image) and phase (determined from the degrees of defocus of said sub-images) of the incoming signal can be measured independently by the optical rangefinder, the aperture synthesis technique, for example, R. Burgmann, P. A. Rosen, E. J. Fielding, *Synthetic aperture radar interferometry to measure Earth's surface topography and its deformation*, Annual Review of Earth and Planetary Sciences 28, 169-209, 2000, becomes applicable to increase the effective base (or baseline, in radio astronomy) of the apparatus. The spatial resolution of the rangefinding apparatus in this case might coincide with the resolution of the device having an aperture equal in size to the base.

Various combinations of optical rangefinders described above and imaging apparatus can be designed. For example, the focusing means of the imaging apparatus can be coupled to a rangefinder to facilitate focusing of the imaging apparatus. The simplest approach, however, is to adapt the rangefinder apparatus to provide an image of the object and use defocus/distance data internally within the same apparatus to correct defocus. Thus, at least one, in-focus image of the, at least one, object can be reconstructed with such apparatus from the image of the object provided by the photosensor. Also, in combining a number of aspects of the present invention, the position or trajectory or course of an object can be visually or digitally followed while, in parallel, speed and direction are quantified making such apparatus suited for many defense and home-security applications, as well as, for various consumer, technical and medical applications.

An image reconstructor can be designed including a certain embodiment of the optical rangefinder, as described in the present document, to provide at least one in-focus image of the object which in-focus image is reconstructed from the spatial spectrum of a, generally, defocused/blurred image in the image plane.

The optical arrangement of the image reconstructor should preferably include, for example, at least one chiral optical arrangement for imaging which arrangement is adapted to provide an image spectrum without zero values in a specified range of focusing errors and in at least one region of the spectrum, usually in the neighborhood of the zero region of the spatial spectrum. Those skilled in the art may conclude that zeros in the spatial spectrum of the image cannot be removed by any digital post filtering.

Such an arrangement can include any chiral optical arrangement, for example, a chiral mask or chirality provided by independent optical channels. For imaging a parabolic chiral optical arrangement is most preferable, which arrangement can be, for example, a parabolic chiral optical mask, or an alternative arrangement comprising a surface with the parabolic screw profile. One of the preferable arrangements is an optical mask in the exit pupil of the optical system providing chiral phase modulation according to $\theta(r,\alpha)=Ar^2\alpha$, where r is the radial coordinate and $\alpha$ is the polar angle in the transverse plane, and A is the steepness parameter. FIG. 6 illustrates the optical response of such a parabolic chiral optical mask.

A phase diversity apparatus can be constructed which apparatus combines a optical rangefinder as described in the present document with means and measures for simultaneous processing of multiple images with known a priori defocus diversity, or relative defocus. One embodiment of such phase diversity apparatus is an image reconstructor which is adapted to provide in-focus images. An alternative embodiment of such phase diversity apparatus is a rangefinder adapted to provide estimation of distances.

The phase diversity apparatus processes multiple images of an object, which images have a known a priori defocus diversity between the image planes and can be processed simultaneously to evaluate the unknown distance and/or reconstruct the in-focus image of the object, allowing increased rangfinding accuracy and increased image reconstruction quality because object-related features can be mathematically excluded from consideration. An example of the processing scheme may include the following steps, see also A. N. Simonov and M. C. Rombach, Otp. Lett. 34, 2111-2113, 2009: First, detection of N defocus diverse images and calculation of their spatial spectra $I_i^{(p)}(\omega_x,\omega_y)$, where p=1 ... N and, by analogy with Eq. (5), $$I_i^{(p)}(\omega_x,\omega_y)=H(\omega_x,\omega_y,\phi_p)\times I_0(\omega_x,\omega_y), \quad (31)$$

where $\omega_p$ is the unknown focusing error but the differences $\phi_p-\phi_k$ are known in advance. For simplicity of analysis one may denote $\phi_p=\phi_0+\delta\phi+\Delta\phi_p$, where $\phi_0$ is the best estimate of defocus found with the methods described in the present document, $\delta\phi$ is the inaccuracy in $\phi_0$, and $\Delta\phi_p$ is the known diversity defocus. Second, construction of a generating function $\Psi$ as a linear combination of $H(\omega_x,\omega_y,\phi_p)$ satisfying $$\Psi = \sum_{p=1}^{N} A_p H(\omega_x, \omega_y, \varphi_0 + \delta\varphi + \Delta\varphi_p) \equiv \sum_{q=0}^{\infty} B_q \delta\varphi^q \cong B_0, \quad (32)$$

where the coefficients $A_p$ should be chosen such that $\Psi$ does not depend on $\delta\phi$. (3) Image reconstruction by, for example, the least-mean-square-error method $$I_0(\omega_x, \omega_y) = \frac{B_0^*}{|B_0|^2 + \varepsilon} \sum_{p=1}^{N} A_p I_i^{(p)}(\omega_x, \omega_y), \quad (33)$$

where $\epsilon^{-1}$ is the signal-to-noise ratio. (4) Correction of the defocus estimate $\phi_0$ by evaluating of $\delta\phi$ with an additional generating function $\Psi'$ satisfying $$\Psi' = \sum_{p=1}^{N} A'_p H(\omega_x, \omega_y, \varphi_0 + \delta\varphi + \Delta\varphi_p) \equiv \sum_{q=0}^{\infty} B'_q \delta\varphi^q \cong B'_0 + B'_1 \delta\varphi. \quad (34)$$

By combining Eqs. (31), (34), the defocus correction can be found $$\delta\varphi = \frac{1}{B'_1}\left\{\frac{1}{I_0(\omega_x, \omega_y)}\sum_{p=1}^{N} A'_p I_i^{(p)}(\omega_x, \omega_y) - B'_0\right\}. \quad (35)$$

(5) Evaluation according to Eq. (35) can be repeated until the specified precision in $\delta\phi$ is reached.

Note that phase diversity principles can also be applied to rangefinding only to, for example, provide for an extended dynamic range for the apparatus to function.

There are a number of options for image reconstruction. An image can be defocused completely or partially, but, depending on the degree of said defocus, at least one, recognizable image is provided. While such image is generally of a low quality, it might be still useful, for example, for target referencing. However, if the degree of defocus is found the registered image can be corrected, at least partially, by reconstruction algorithms, for example, the least-mean-square-error inverse filter (J. W. Goodman, Introduction to Fourier Optics, McGraw-Hill Co., Inc., New York, 1996). More complex image reconstruction algorithms requiring lower signal-to-noise premium can also be applied. Analogously, image distortions caused by the presence of the optical mask can be also corrected with similar processing methods. In this case, the phase and amplitude functions of the mask have to be known a priori. The methods above can be extended to include additional methods and processing steps adapted to provide image reconstruction. Such methods, for example, provide reconstruction of, at least one, in-focus image of the, at least one, object. Similarly to the foregoing, the methods can be also extended to provide reconstruction of multiple sub-images from the corresponding multiple sub-areas of the, at least one, image of the object. The man skilled in the art of digital image reconstruction will conclude that having a blurred image (or its spatial spectrum) and knowing the degree of defocus relative to the in-focus image plane, an in-focus image can be reconstructed. In practice, the reconstruction quality depends mainly on the quality of optics (i.e., aberrations and spatial bandwidth), spatial resolution and dynamic range of the photosensor. Additionally, a method can be adapted to obtain an in-focus sub-image from a corresponding defocused sub-image of the, at least one, object. Moreover, a large number of such in-focus sub-images from corresponding defocused sub-images can be combined into a final in-focus image of the object. Three-dimensional sharp images, or, alternatively EDF images, can thus be constructed.

Clearly, traditional imaging options are also created by, for example, mechanically moving a static photomask out of the optical path, or changing the optical shape of a variable mask provided by, for example, a liquid crystal screen or adaptive mirror into, for example, a planar mask, which turns the rangefinder into a traditional type camera imaging system.

Note that an embodiment of the optical rangefinder can be adapted to an optical pathfinder to provide an estimate of at least one optical path, for example, the length of said optical path, or another characteristic, but such pathfinder can only function when the distance between the object and the rangefinder is known beforehand, or known a priori. This is a somewhat uncommon application of a rangefinder. The optical path is a combination of the physical distance and the refractive index of the medium through which the light travels. The optical path can vary while the distance remains constant, for example, due to variations in refractive index of the medium, if the medium is air, due to, for example, air pressure, humidity etc. The rangefinder can be also adapted to measure atmospheric disturbances and turbulence, wind speed and maybe even measure sound in air, operating as a passive optical microphone, and be adapted to measure equivalent phenomena in liquids.

Said optical path can also be determined for multiple sub-images which information can subsequently be combined in an optical-path map. Such optical-path map allows for full evaluation of said disturbances or other phenomena. The concept of an optical-path map is novel.

The optical rangefinder described so far can be adapted to provide modal wavefront sensing and, thus, become a modal wavefront sensor. Those skilled in the arts will conclude that the concepts set forth in the present document can be extended to likely any aberration of choice by adaptation and derivation of the formulas and mathematical concepts disclosed in the present document. The optical rangefinder described so far provides degrees of defocus because of practical rangefinding applications but aberrations other than defocus can also be determined with an apparatus largely similar to said optical rangefinder. Clearly, the optical arrangement must be adapted to said specific other aberrations. For example, in Zernike modal representation, a circular optical mask with the phase function $\theta(x,y)=Axy$, where A is the steepness of the phase function, results in scaling and rotation of the OTF in response to astigmatic distortion $W=\phi(x^2-y^2)$ of the wavefront.

Such modal wavefront sensor can be constructed comprising: an imaging system including, at least one, optical arrangement to modulate, at least one, incoming light beam to project, at least one, image of, at least one, object on a photosensor, and at least one processing means including means to transform the image into a corresponding electronic image, means adapted to provide the spatial spectrum of an image by spectral decomposition, in which the optical arrangement is adapted to modulate the incoming light beam such that at least one wavefront aberration results in at least one displacement of the spatial spectrum of the image relative to a reference pattern, which pattern can be a characteristic pattern, for example, the known inherent spectral response of the optical arrangement, and additional processing means adapted to directly derive the degree of at least one wavefront aberration from said degree of displacement of the spatial spectrum relative to the reference pattern.

Method for Rangefinding and Wavefront Sensing

Exemplary methods for optical rangefinding include the following procedures and processing steps, with procedures and steps not necessarily restricted hereto: projection of an image of at least one object on a photosensor, modulation, for example chiral modulation, of the incoming light beam by an optical arrangement, processing to transform the image into a corresponding electronic image, provide the spatial spectrum of an image by spectral decomposition and derive the distance from the object to the rangefinder based on degree of defocus of the image, and modulation which adapts the incoming light beam such that defocus of the image of the at least one object in the image plane relative to the in-focus image plane results in a displacement of the spatial spectrum of the image relative to a reference pattern, and additional processing which directly derives the degree of defocus of the image of the object in the image plane relative to the in-focus image plane from said degree of displacement of the spatial spectrum relative to the reference pattern. The method for optical rangefinding can be adapted such that said modulation of the light beam is a chiral modulation. Additionally, the method for optical rangefinding can be adapted such that it provides at least one characteristic pattern in the spatial spectrum to allow for detection of said displacements. Such pattern can be, but is not restricted to, a pattern of lines. The characteristic pattern can be, for example, the inherent spectral response of the optical arrangement known in advance.

Also, a method for image reconstruction provides reconstruction of at least one in-focus image of the object from the spatial spectrum of the image. For details of such reconstruction refer to the description of the image reconstructor and elsewhere in the present document.

The method for optical rangefinding can be adapted to measure the optical path, for example the length of the optical path, once the distance between the object and the rangefinder is known precisely beforehand. Those skilled in the art may conclude that the optical path combines, for example, physical distance with the refractive index of the medium through which the light travels.

The method for optical rangefinding described above provides the degree of defocus. Those skilled in the art will conclude that also aberrations other than defocus can be determined by a method largely similar to rangefinding described above, resulting in modal wavefront sensing. Other aberrations can be determined by inclusion of an optical arrangement adapted to said specific other aberrations. Such method for modal wavefront sensing can comprise: projection of an image of at least one object on a photosensor, modulation of the incoming light beam by an optical arrangement, processing to transform the image into a corresponding electronic image, provide the spatial spectrum of an image by spectral decomposition, and modulation which adapts the incoming light beam such that at least one wavefront aberration results in at least one displacement of the spatial spectrum of the image relative to a reference pattern which reference pattern can, for example, correspond to the inherent known spectral response of the optical arrangement, and additional processing which directly derives the degree of at least one wavefront aberration from said degree of displacement of the spatial spectrum relative to the reference pattern.

The invention claimed is:

1. A passive optical rangefinder, comprising:
   a) a photosensor adapted to transform an image projected onto it into a corresponding electronic image;
   b) an imaging system adapted to provide projection of the image of at least one object on the photosensor;
   c) spectral processing means adapted to provide the spatial spectrum of the image by spectral decomposition;
   d) defocus processing means adapted to provide the distance from the object to the rangefinder based on a degree of defocus of the image; and
   e) an optical arrangement comprising,
      (1) at least one chiral optical arrangement adapted to provide chiral modulation such that the degree of displacement of the spatial spectrum relative to a reference pattern depends on the degree of defocus of the image, with the spatial spectrum comprising at least one detectable feature, with
         i. chiral modulation meaning modulation of phase and amplitude of light such that the generalized pupil function of the optical system is not invariant under parity transformation,
         ii. reference pattern meaning any synthetic structure in the spatial spectrum domain suitable to measure the degree of displacement, and
         iii. a detectable feature created by the optical arrangement independent from the object for allowing determination of the degree of displacement of the spatial spectrum relative to the reference pattern, and (2) additional processing means adapted to derive the degree of defocus of the image from the degree of displacement by comparison of the spatial spectrum with the reference pattern.

2. The passive optical rangefinder of claim 1, wherein the chiral optical arrangement includes at least one chiral optical mask.

3. The passive optical rangefinder of claim 1, wherein the chiral optical arrangement includes a combination of at least two independent optical channels.

4. The passive optical rangefinder of claim 1, wherein the chiral optical arrangement is adapted to provide a characteristic reference pattern obtained from the inherent spectral response of the passive optical arrangement.

5. The passive optical range-finder of claim 1, wherein the chiral optical arrangement is adapted to convert defocus changes into either detectable rotation, scaling, or lateral shift of features.

6. The passive optical rangefinder of claim 1, wherein the rangefinder is adapted to provide a defocus map comprising the degrees of defocus of at least two sub-images from corresponding sub-areas of the image of the object independently.

7. The passive optical rangefinder of claim 6, wherein the rangefinder is adapted to provide a depth map based on the defocus map, which depth map comprises the distances from the sub-sections of the object to the rangefinder independently.

8. The passive optical rangefinder of claim 1, wherein the rangefinder is adapted to provide an optical-path map comprising at least one optical path, the optical path being the combination of the physical distance and the refractive index of the medium through which the light travels.

9. A method for passive optical rangefinding, comprising:
 a) transforming an image projected on a photosensor into a corresponding electronic signal;
 b) projecting the image of at least one object on the photosensor by an imaging system;
 c) providing the spatial spectrum of the image by spectral decomposition by spectral processing means; and
 d) providing the distance from the object to the rangefinder based on the degree of defocus of the image by defocus processing means,
wherein the method further comprises:
 (1) providing chiral modulation such that the degree of displacement of the spatial spectrum relative to a reference pattern depends on the degree of defocus of the image, with spatial spectrum comprising at least one detectable feature, by at least one chiral optical arrangement, with:
  i. chiral modulation meaning modulation of phase and amplitude of light such that the generalized pupil function of the optical system is not invariant under parity transformation,
  ii. reference pattern meaning any synthetic structure in the spatial spectrum domain suitable to measure the degree of displacement, and
  iii. detectable feature meaning a feature created by the optical arrangement independent from the object for allowing determination of the degree of displacement of the spatial spectrum relative to the reference pattern, and
 (2) deriving the degree of defocus of the image from the degree of displacement by comparison of the spatial spectrum with the reference pattern, by additional processing means.

10. The method for passive optical rangefinding of claim 9, further comprising providing a depth map comprising the distances from the sub-sections of the object to the rangefinder independently by the rangefinder.

\* \* \* \* \*